(12) United States Patent
Evans

(10) Patent No.: US 9,499,389 B2
(45) Date of Patent: *Nov. 22, 2016

(54) LIQUID TRANSPORTATION

(71) Applicant: CHS Inc., Inver Grove Heights, MN (US)

(72) Inventor: Kenneth R. Evans, Kennewick, WA (US)

(73) Assignee: CHS Inc., Inver Grove Heights, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/564,941

(22) Filed: Dec. 9, 2014

(65) Prior Publication Data

US 2015/0090363 A1 Apr. 2, 2015

Related U.S. Application Data

(63) Continuation of application No. 12/784,098, filed on May 20, 2010, now Pat. No. 8,905,089.

(60) Provisional application No. 61/179,938, filed on May 20, 2009.

(51) Int. Cl.
*B67D 7/34* (2010.01)
*G05D 7/06* (2006.01)

(52) U.S. Cl.
CPC ............. *B67D 7/348* (2013.01); *G05D 7/0617* (2013.01)

(58) Field of Classification Search
CPC ................................. B67D 7/34; B67D 7/348
USPC .................... 141/1, 83, 94, 95, 231
See application file for complete search history.

(56) References Cited

U.S. PATENT DOCUMENTS

| 3,650,303 | A | 3/1972 | Chambers et al. |
| 4,469,149 | A | 9/1984 | Walkey et al. |
| 4,838,323 | A | 6/1989 | Watts |
| 5,209,275 | A | 5/1993 | Akiba et al. |

(Continued)

FOREIGN PATENT DOCUMENTS

| AU | 2007200878 | 9/2007 |
| EP | 1832548 | 9/2007 |

OTHER PUBLICATIONS

Civacon, "Strengthen the weak link in your blending process control," 1994, 2 pages.

(Continued)

*Primary Examiner* — Timothy L Maust
(74) *Attorney, Agent, or Firm* — Brooks, Cameron & Huebsch, PLLC

(57) ABSTRACT

A liquid transportation system includes a loading station where a liquid is loaded into a container of a delivery vehicle, and a drop off location where the delivery vehicle transfers the liquid into a storage tank. The storage tank includes a tank marker including a first identification device that generates a first signal. The first signal identifies a type of liquid to be stored in the storage tank. The delivery vehicle includes a product marker having a control system and a second identification device. The second identification device identifies a type of liquid contained in the container. The control system receives the first signal and the second signal and determines whether the type of the liquid stored in the container is the same as the type of liquid to be stored in the storage tank.

20 Claims, 17 Drawing Sheets

(56) References Cited

U.S. PATENT DOCUMENTS

| | | |
|---|---|---|
| 5,309,957 A | 5/1994 | Saisuu |
| 5,359,522 A | 10/1994 | Ryan |
| 5,420,797 A * | 5/1995 | Burns .................. G06Q 10/047 222/1 |
| 5,460,210 A | 10/1995 | Koeninger |
| 5,507,326 A | 4/1996 | Cadman et al. |
| 5,515,890 A | 5/1996 | Koeninger |
| 5,579,233 A * | 11/1996 | Burns .................. B67D 7/145 221/23 |
| 5,604,681 A | 2/1997 | Koeninger |
| 5,605,182 A | 2/1997 | Oberrecht et al. |
| 5,654,497 A | 8/1997 | Hoffheins et al. |
| 5,655,577 A | 8/1997 | Loen et al. |
| 5,722,469 A | 3/1998 | Tuminaro |
| 5,771,178 A | 6/1998 | Stemporzewski, Jr. et al. |
| 5,966,311 A | 10/1999 | Stemporzewski, Jr. et al. |
| RE36,510 E | 1/2000 | Burns |
| 6,347,723 B1 | 2/2002 | Barlian et al. |
| 6,394,150 B1 | 5/2002 | Haimovich et al. |
| 6,481,627 B1 | 11/2002 | Guerreri |
| 6,616,036 B2 | 9/2003 | Streicher et al. |
| 6,622,758 B2 | 9/2003 | Drube et al. |
| 6,649,829 B2 | 11/2003 | Garber et al. |
| 6,897,374 B2 | 5/2005 | Garber et al. |
| 7,012,536 B2 | 3/2006 | McConnel et al. |
| 7,188,771 B2 | 3/2007 | Poulter |
| 7,628,182 B2 | 12/2009 | Poulter et al. |
| 7,647,954 B2 | 1/2010 | Garber |
| 8,051,882 B2 | 11/2011 | Koeninger et al. |
| 8,261,784 B2 | 9/2012 | Gerard et al. |
| 8,905,089 B2 * | 12/2014 | Evans ........................ 141/231 |

OTHER PUBLICATIONS

Civacon, "The Smartlok™ System," 1994, 4 pages.
Civacon. "Smartlok™ Coupling Verification System by CIVACON," Jan. 1995, 10 pages.
FMC Technologies Measurement Solutions, Inc., Sening® Innovative Tank Truck Systems, "Sening® NoMix Cross-Over Prevention," Apr. 2009, 4 pages.
Liquip International, Downstream News, Apr. 2007, 10 pages, Issue 4.
Petition for Inter Partes Review of U.S. Pat. No. 8,905,089, Dec. 15, 2015, 68 pages.

* cited by examiner

LIQUID TRANSPORTATION

CROSS REFERENCE TO RELATED APPLICATIONS

This application is a continuation of U.S. patent application Ser. No. 12/784,098, filed on May 20, 2010, now U.S. Pat. No. 8,905,089, which claims priority to U.S. Provisional Application No. 61/179,938 filed on May 20, 2009, entitled FUEL TRANSPORTATION, the disclosure of which is incorporated by reference herein in its entirety.

BACKGROUND

It is often necessary to transfer liquid from one location to another location. An example of such liquid transfer is the transfer of fuel. Before fuel can be made available to the consumer at a gas station, the fuel must be delivered to that location. The process typically begins with crude oil being pumped domestically or imported by ships or pipelines from other countries. Crude oil is then refined into the desired fuel, such as gasoline. The fuel is then stored in large storage containers or may be further distributed by additional pipelines, tankers, or barges to other locations. Eventually the fuel arrives at a bulk storage location. Tanker trucks are used to deliver the fuel from the bulk storage location to the gas station where it is made available to the consumer.

The fuel is stored in underground, or above ground storage containers. Most gas stations have various types of fuel available for purchase. Common examples include regular unleaded, premium unleaded, ethanol-gasoline mixes, and diesel. Each type of fuel is stored in a separate container.

Sometimes a fuel delivery is inadvertently put into the wrong tank. This can be a very costly mistake. For example, if a delivery of diesel fuel is unloaded into an unleaded fuel tank, the entire content of the tank must be pumped out and replaced. The mixed fuel that is removed must then be properly recycled or disposed of. The station will likely lose sales of that fuel until it can be replaced. If the mixed fuel is sold to consumers, the mistake may result in further damage and expense.

SUMMARY

In general terms, this disclosure is directed to systems and methods for reducing the chance of unintentional liquid mixes by verifying that liquid is properly delivered to a correct storage tank.

One aspect is a system for reducing unintentional mixing of different liquid types in a storage tank. The system includes a first identification device and a control system. The first identification device is coupled to a liquid delivery vehicle. The liquid delivery vehicle includes a container having a liquid stored therein. The first identification device is configured to generate a first signal. The control system including at least one processing device that operates to: receive the first signal from the first identification device; receive identifying information from a second signal, the identifying information originating from a second identification device associated with a storage tank; and determine whether a type of the liquid stored in the container is the same as a type of a liquid to be stored in the storage tank, prior to a transfer of the liquid from the container of the liquid delivery vehicle into the storage tank.

Another aspect is a method for reducing unintentional mixing of different liquid types in a storage tank, the method comprising: receiving a first signal from a first identification device, the signal being associated with a type of a liquid in a container of a delivery vehicle; receiving a second signal from a second identification device, the second signal being associated with a type of liquid in a storage tank; and determining whether a type of the liquid stored in the container is the same as a type of a liquid to be stored in the storage tank using the first signal and the second signal.

Yet another aspect is a method of operating a product marker of a liquid delivery vehicle, the method comprising: after determining that an overfill protection system has been connected to the delivery vehicle, receiving a signal from a first identification device of the product marker, the signal being associated with an identified type of a liquid in a container of the liquid delivery vehicle; and determining whether the signal indicates that the container is empty.

DETAILED DESCRIPTION

Figure 1:
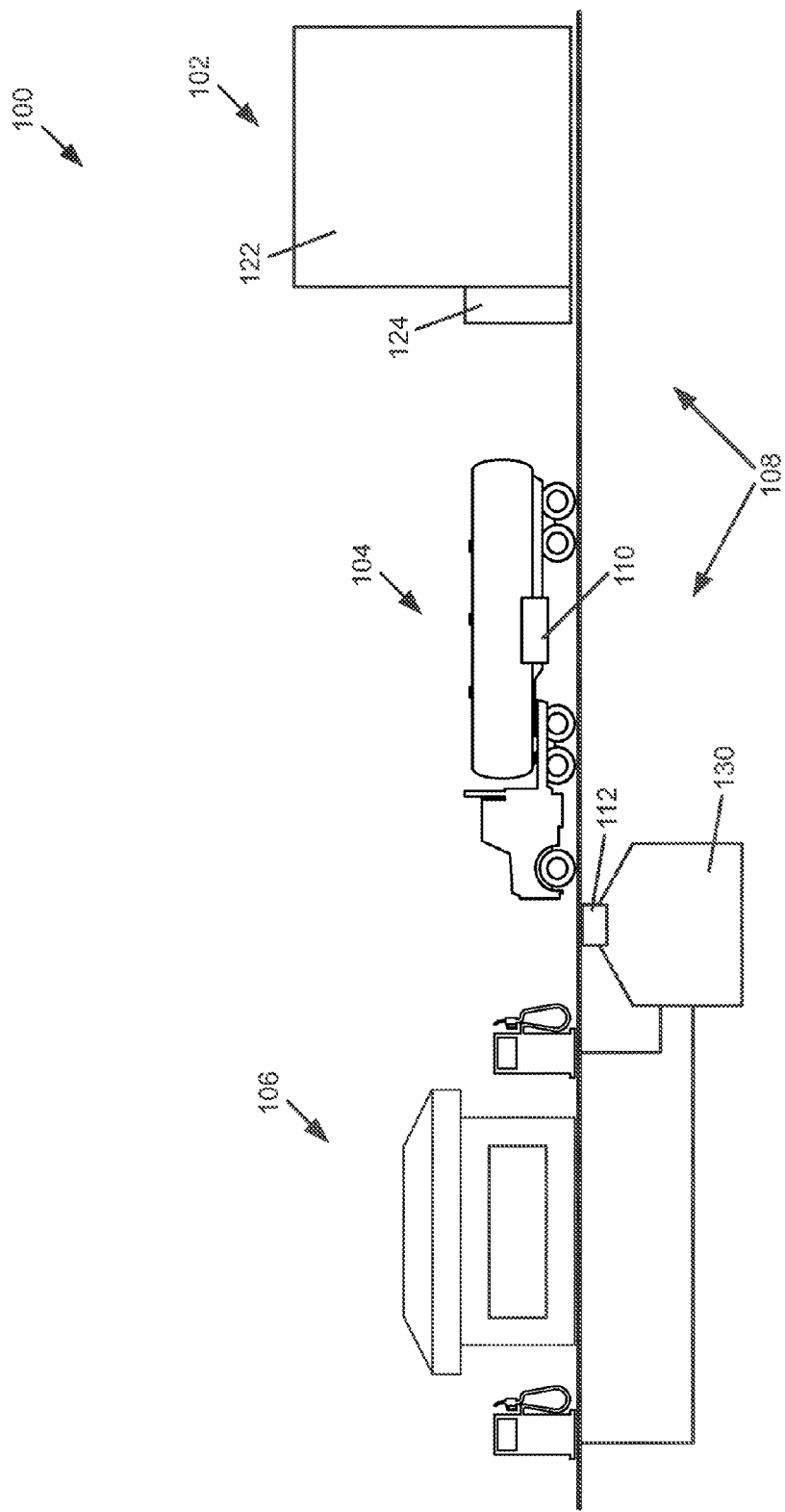
FIG. 1 is a schematic diagram of an example fuel transportation system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The logical operations of the various embodiments of the present disclosure can be implemented as: (1) a sequence of computer implemented operations running on a computing device; and/or (2) interconnected machine modules within the computing device. Modules represent functions executed by program code such as commonly available programming languages. The implementation used is a matter of choice dependent on the performance requirements of the particular programmable device, and associated computing systems. Accordingly, the logical operations making up the embodiments described herein can be referred to alternatively as operations, modules, and the like.

FIG. 1 is a schematic diagram of an example fuel transportation system 100. In this example, the fuel transportation system 100 includes a pick up location 102, tanker truck 104, and drop off location 106. Fuel transportation system 100 also includes a fuel mix reduction system 108. The fuel mix reduction system 108 includes a product marker system 110 and a tank marker system 112.

Pickup location 102 is a location where fuel is stored in bulk and made available for pickup by a tanker truck 104. Pickup location 102 typically includes at least one storage tank 122 (and possibly many storage tanks) and a fuel loading rack 124.

Tanker truck 104 is typically a semi-truck tractor including a tanker trailer, although other embodiments include other transportation vehicles. Tanker truck 104 receives a load of fuel from pickup location 102 and delivers the fuel to drop off location 106. In some embodiments product marker system 110 operates to identify the type or types of fuel being transported by tanker truck 104. Tanker truck 104 is an example of a liquid delivery vehicle. Other embodiments include other liquid delivery vehicles configured to transport a liquid to a drop off location 106 and transfer the liquid into a storage tank at the drop off location 106.

When tanker truck 104 arrives at drop off location 106, fuel is delivered to at least one delivery tank 130, which is often located underground. However, other embodiments include other delivery tanks such as an above-ground or partially aboveground delivery tank. Some embodiments include multiple delivery tanks, such as for storing multiple types of fuel. The fuel mix reduction system, including product marker system 110 and tank marker system 112, confirm that fuel is being delivered to the proper fuel tank to reduce the chance of an inadvertent fuel mix occurring.

Figure 2:
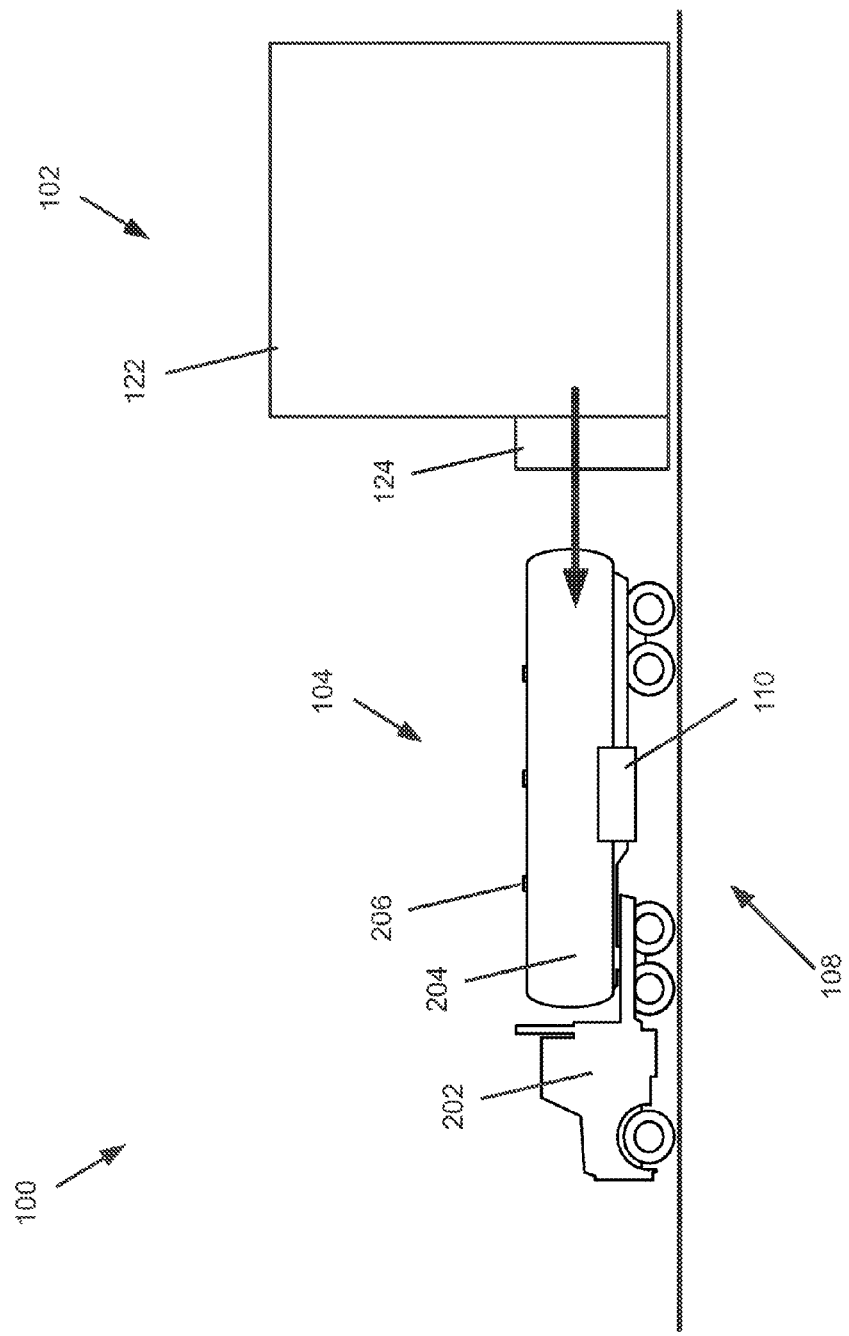
FIG. 2 is a schematic diagram of a portion of the fuel transportation system shown in FIG. 1.

FIG. 2 is a schematic diagram of a portion of the fuel transportation system 100. Specifically, FIG. 2 illustrates the loading of fuel into tanker truck 104 at pickup location 102. As previously discussed, some embodiments of pickup location 102 include storage tank 122 and fuel loading rack 124. Also in some embodiments tanker truck 104 includes tractor 202, tanker 204, overfill protection system 206, and product marker system 110 of the fuel mix reduction system 108.

Example methods of filling the tanker truck will now be described with reference to FIG. 2. When tanker truck 104 arrives at the pickup location 102 to pickup a load of fuel, it is advanced to a fuel loading rack 124 where the tanker truck is turned off. The fuel loading rack 124 typically includes a loading rack controller that can be connected with the overfill protection system 206 of tanker truck 104. To begin, the operator makes the connection.

Examples of overfill protection systems are those manufactured and distributed by the Scully Signal Company located in Wilmington, Mass. One example of the loading rack controller of loading rack 124 is the INTELLITROL® multi-function loading rack controller. An example of overfill protection system 206 is the INTELLICHECK® truck-mounted and retained product monitoring system and overfill sensors. The overfill protection systems operate to monitor the filling of each container of tanker 204 to ensure that the containers are not overfilled.

The connection between the loading rack 124 and the overfill protection system 206 is made to begin the filling process. In some embodiments, product marker system 110 is configured to detect the connection and to enter a sleep mode when the operator makes the connection to reduce the chance of an electrical spark occurring during filling. The sleep mode is a low power mode in which most components of the product marker system 110 are deactivated and powered off.

In some embodiments, before the product marker system 110 enters the sleep mode, it checks the status of its fuel type selector. If the fuel type selectors are not all set to empty, then power to the overfill protection system 206 is turned off by product marker system 110 to stop the loading of fuel into a container that already contains fuel. In this way, the fuel mix reduction system reduces the chance of mixing fuel in the containers. If the operator confirms that all containers are empty but the operator forgot to switch a fuel type selector to empty, the operator may do so.

The fault condition is reset by disconnecting the overfill protection system and repeating the process with all fuel type selectors set to empty. Some embodiments include a manual override input device of product marker system 110 that allows the operator to manually restore power to the overfill protection system, if necessary, so that filling can proceed.

A fuel hose is then connected between the loading rack 124 and the tanker truck 104. Fuel is then transferred through the fuel hose from storage tank 122 to a container of tanker 204. While the container is being filled, the operator adjusts the appropriate product marker of product marker system 110 to identify the type of fuel that is being loaded into the associated container. Each compartment of tanker 204 is loaded in this manner until all loading has been completed. The fuel hose and overfill protection system 206 are then disconnected from loading rack 124.

In some embodiments, product marker system 110 detects when the overfill protection system 206 is disconnected from the loading rack 124. Once detected, product marker system 110 remains dormant for a period of time, such as five minutes, before resuming normal operation.

The dormant period discussed above is programmable in some embodiments, but is a fixed period in a range from about 30 seconds to about 15 minutes in other embodiments. An advantage of the dormant period is, for example, to keep the product marker system 110 from turning on before the filling has been completed and the truck has left the loading rack.

Once tanker truck 104 is loaded it then proceeds transport the fuel from pickup location 102 to drop off location 106.

Figure 3:
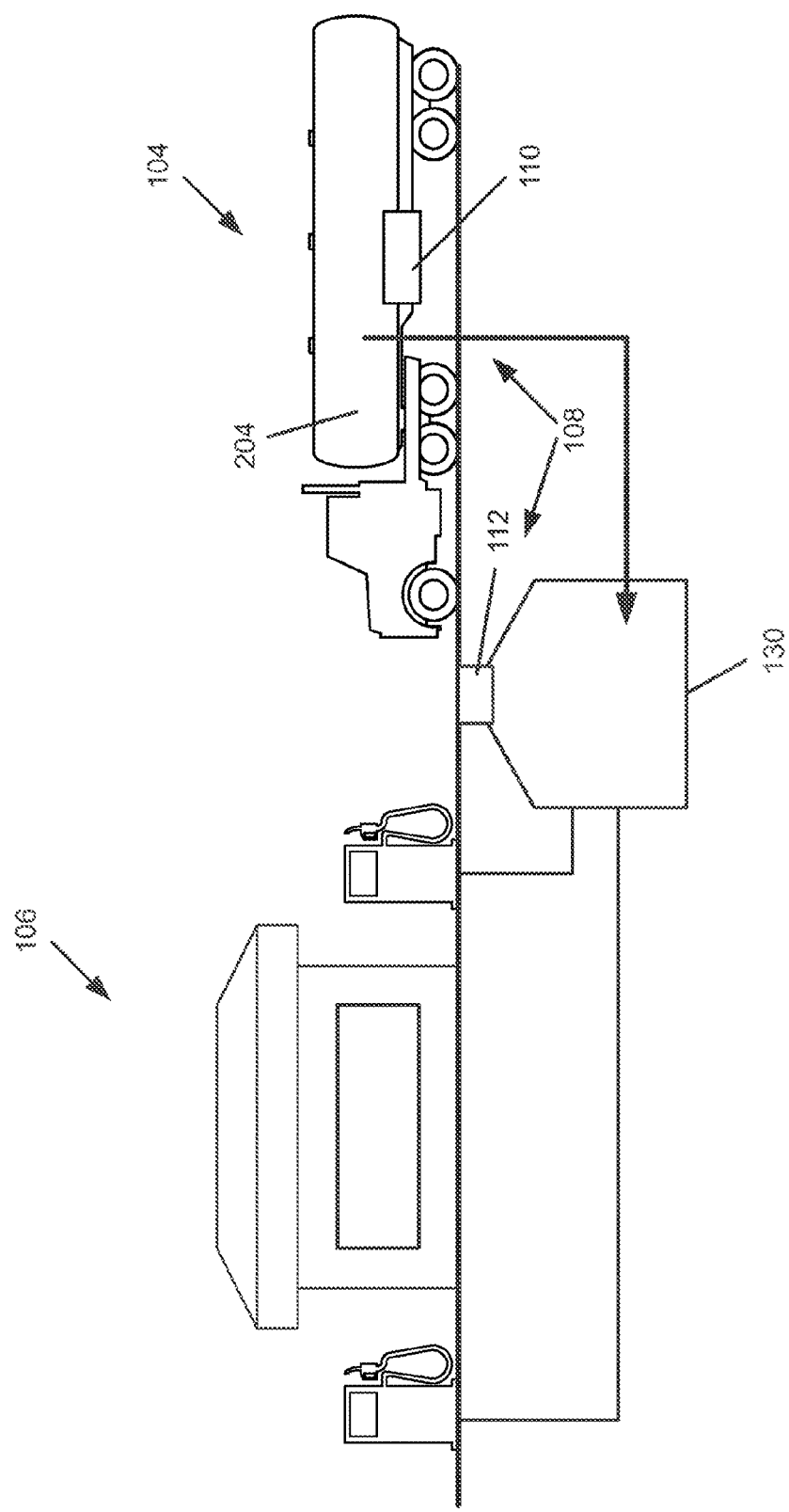
FIG. 3 is a schematic diagram of another portion of the fuel transportation system shown in FIG. 1.

FIG. 3 is a schematic diagram of another portion of the fuel transportation system 100. Specifically, FIG. 3 illustrates the delivery of fuel in tanker truck 104 to drop off location 106. Fuel transportation system 100 includes fuel mix reduction system 108. The fuel mix reduction system 108 includes product marker system 110 of tanker truck 104 and tank marker system 112 of drop off location 106. Drop off location 106 also includes one or more delivery tanks 130. Drop off location 106 may also include one or more fuel pumps for dispensing fuel from delivery tank 130 to a consumer.

Example methods of delivering fuel to a drop off location will now be described with reference to FIG. 3. When tanker truck 104 arrives at drop off location 106, it is advanced to a location near delivery tank 130. A fuel hose is then connected between tanker truck 104 and delivery tank 130, and a marker cable is connected between product marker system 110 and tank marker system 112. In an embodiments utilizing wireless communication, a marker cable need not be connected.

The operator then initiates the unloading of fuel by opening the internal valve (e.g., a pneumatic switch or mechanical arm). The product marker system 110 detects that unloading has been initiated. The product marker system 110 then checks to see if the fuel to be unloaded matches the fuel type of the delivery tank. In one embodiment, the check is performed by comparing the fuel type indicated by the fuel type selector of the product marker system 110 with the fuel type indicated by the tank marker system.

If the fuel types match, product marker system 110 permits the fuel unload to proceed and records logs details of the unload. If the fuel types do not match, product marker system 110 initiates an alarm to alert the operator to a potential fuel type mismatch.

In some embodiments product marker system 110 further includes an unload prevention device that can be operated by product marker system 110 to stop fuel from being unloaded from the container of tanker truck 104. In such embodiments, the unload prevention device is initiated upon the determination that the fuel types do not match. In some embodiments, an audible alarm and the unload prevention device are both initiated to alert the operator to the potential fuel type mismatch and to reduce inadvertent unloading of fuel into the incorrect delivery tank 130. The operator then checks the connections and makes changes as necessary.

In some embodiments, the product marker system 110 includes a manual override that allows the operator to override the product marker system to continue unloading the fuel. This can be desirable, for example, for legacy delivery tanks that do not support the product marker system.

Some embodiments include a delay function that requires an operator to depress the bypass button for a predetermined period of time. For example, the delay function can require that the bypass button be held for a time period in a range from about 1 second to about 30 seconds, and preferably from about 5 seconds to about 15 seconds. The delay can be selected so that the delay is longer than the time it takes to hook-up the product marker system 110. This delay function encourages the operator to use the product marker system 110, rather then choosing to simply manually override the system for each delivery.

While the fuel is transferred into the delivery tank 130 (or after it has been completed), the operator sets the fuel type selector for the unloaded compartment to empty. When the product marker system 110 detects that the unload has been completed (such as when the internal valve is closed), product marker system 110 confirms that the fuel type marker has been set to empty. If not, an alarm is initiated after a period of time (such as 15 seconds) to warn the operator that the fuel type marker has not been properly set to empty.

Figure 4:
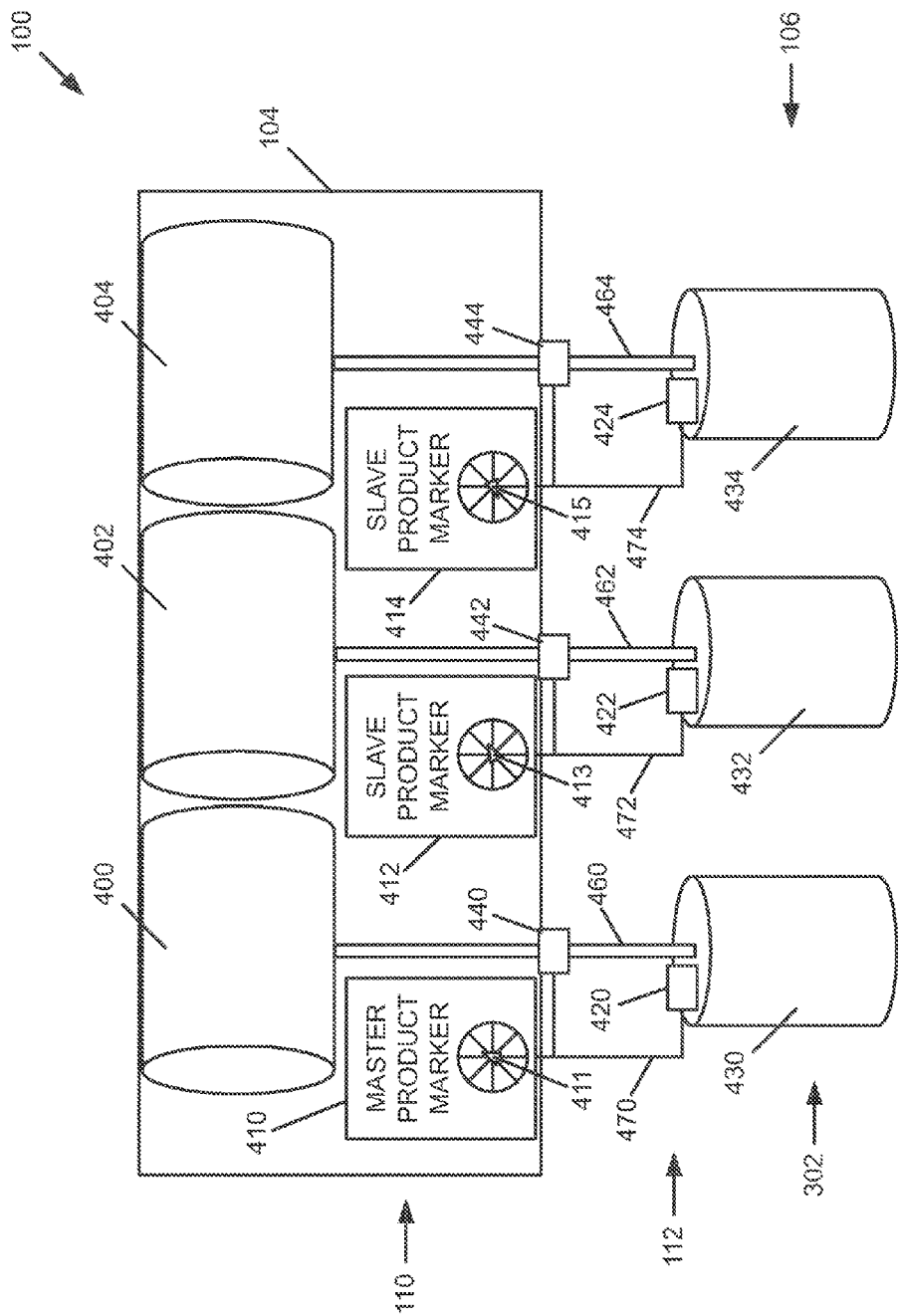
FIG. 4 is a block diagram of the portion of the fuel transportation system shown in FIG. 1.

FIG. 4 is a block diagram of another portion of the fuel transportation system 100. Specifically, FIG. 4 illustrates the delivery of fuel from tanker 204 (including multiple containers 400, 402, and 404) of a tanker truck 104 to multiple delivery tanks 130 (including delivery tanks 430, 432, and 434) at a drop off location 106.

As discussed above, fuel transportation system 100 includes fuel mix reduction system 108 having a product marker system 110 and a tank marker system 112. In this example, fuel mix reduction system 108 includes separate product markers for each container and separate tank markers for each delivery tank. For example, product marker system 110 includes master product marker 410, and slave product markers 412 and 414. Product markers 410, 412, and 414 each include a fuel type selector 411, 413, and 415. Tank marker system 112 includes tank markers 420, 422, and 424. Fuel mix reduction system 108 also includes flow control systems 440, 442, and 444, such as described in more detail below with reference to FIG. 5. One or more fuel hoses 460, 462, and 464 are used to provide a fluid flow path between containers 400, 402, and 404 and the respective delivery tanks 430, 432, and 434. One or more marker cables 470, 472, and 474 are used to electrically couple product markers 410, 412, and 414 with the respective tank markers 420, 422, and 424.

In another possible embodiment, marker cables connect wirelessly with tank markers, such as using wireless communication devices, (e.g., radio or infrared (or other) electromagnetic radiation). In another possible example, tank markers 420, 422, and 424 are RFID tags or optical tags, and product markers include an RFID tag reader or optical tag reader. Other embodiments include other communication devices. Some embodiments product markers that are configured for wireless communication do not include marker cable input port 612 or pump-off input port 614.

In this example, tanker truck 104 includes tanker 204 having multiple containers 400, 402, and 404. Each container of tanker 204 has an internal volume that is physically separated from the other containers. Some embodiments of tanker truck 104 include only one container. Other embodiments include two or more containers, such as two, three, four, or more containers. Because the internal volumes of containers are physically separated from each other, fuel stored within a container cannot mix with fuel stored in another container.

When fuel is loaded into containers 400, 402, and 404, the fuel type selectors 411, 413, and 415 of the respective product markers 410, 412, and 414 are adjusted by the operator to identify the type of fuel that has been loaded into the respective container. Fuel type selectors 411, 413, and 415 are examples of identification devices, because they operate to identify a type of liquid in a container (including a "no fuel" or "empty" type-indicative of an empty container). In this example, container 400 includes a first fuel type, container 402 includes a second fuel type, and container 404 includes a third fuel type. The fuel types can be the same or different. Examples of fuel types include, but are not limited to, mid-grade, premium, no lead (or "unleaded"), #1 clear, #2 clear, premium with ethanol, mid-grade with ethanol no lead with ethanol, #1 dye, #2 dye, empty, and other.

In some embodiments, each position of the fuel type selector 411 is associated with a different resistance. The resistances can be arranged, for example, in a variable voltage divider configuration; where adjustment of the fuel type selector adjusts a connection point to the variable voltage divider, thereby providing a different resistance at each position. A small current is generated by a control system of the product marker 410, such as between 1 and 100 microvolts, which is then passed through the variable resistance of the fuel type selector 411. An analog to digital converter of the processor detects the voltage drop across the variable resistance. An exemplary table of possible resistance values is provided as Table 1. Other embodiments include other values and fuel types.

TABLE 1

| FUEL TYPE | NOMINAL RESISTANCE VALUE |
| --- | --- |
| No lead | 143 Ohm |
| Mid grade | 37.4 Ohm |
| Premium | 84.5 Ohm |
| Premium with ethanol | 464 Ohm |
| Mid grade with ethanol | 665 Ohm |
| No lead with ethanol | 976 Ohm |
| #1 dye diesel | 1.5K Ohm |
| #2 dye diesel | 2.49 Ohm |
| Other | 0 Ohm |
| #2 clear diesel | 324 Ohm |
| #1 clear diesel | 221 Ohm |

When tanker truck 104 arrives at the drop off location 106, it is important that fuel in the containers 400, 402, and/or 404 be unloaded into the proper delivery tanks 130. A drop off location 106 may have one or more delivery tanks 130, such as two, three, four, or more. In this example, drop off location 106 has three delivery tanks 430, 432, and 434. Delivery tank 430 is configured to store the first fuel type, delivery tank 432 is configured to store the second fuel type, and delivery tank 434 is configured to store the third fuel type.

Each delivery tank has an associated tank marker system 112. Delivery tank 430 is associated with tank marker 420, delivery tank 432 is associated with tank marker 422, and delivery tank 434 is associated with tank marker 424. In some embodiments, tank markers 420, 422, and 424 are physically connected with or connected adjacent to the respective delivery tank 130, such as next to the fuel hose connection for the respective delivery tank. Tank markers are another example of an identification device, because tank markers identify a type of liquid that is stored or is to be stored in a storage tank.

To deliver fuel from container 400 to delivery tank 430, the operator connects fuel hose 460 between the output port of container 400 and the input port of delivery tank 430. The operator also connects marker cable 470 between master product marker 410 and tank marker 420. In embodiments configured for wireless communication, manual physical connection of the marker cable 470 between master product marker 410 and tank marker 420 is not necessary. In some embodiment, however; an activation button is provided on one or both of the product member and the tank marker to initiate communication.

The operator then initiates the transfer of fuel from tanker truck 104 to delivery tank 430 with the flow control system 440 by opening the internal valve for the respective container. Master product marker 410 is connected with flow control system 440 and detects that the unload has been initiated. At that point, the control system of the master product marker 410 performs a check to determine whether the fuel type indicated by the fuel type selector 411 matches the fuel type indicated by the tank marker 420. For example, the control system receives a signal from the fuel type selector 411 associated with the type of fuel in the container. The control system also receives another signal from the tank marker 420 associated with a type of fuel to be stored in the storage tank. In one example embodiment, the control system generates a voltage that is transferred to the fuel type selector 411 and another voltage that is transferred to the tank marker 420. The fuel type selector 411 includes a resistance that varies according to the setting of the adjustment knob. The resulting current is measured by the control system to determine the setting of the adjustment knob. Similarly, the tank marker also has a resistance that is selected based on the type of fuel that is to be stored in the storage tank. The resulting signals can be used by the control system to determine the fuel types. If the fuel types match, then product marker 410 permits the unload to proceed. If the fuel types do not match, then product marker 410 takes precautionary action. In another possible embodiment, however, determining if the fuel types match involves determining if the resistances match. In another possible embodiment, determining if the fuel types match involves determining if a detected current or voltage drop of the signals match.

In some embodiments the precautionary action is to initiate an alarm to warn the driver of a possible fuel type mismatch. In other embodiments, the precautionary action is to stop the transfer of fuel from container 400 to delivery tank 430 using flow control system 440. This can be accomplished, for example, by closing the internal valve. Other embodiments include other precautionary actions or combinations of precautionary actions. In this way, fuel mix reduction system acts to stop the inadvertent mix of different fuel types, or at least reduce the chance that such a fuel mix will occur.

Figure 6:
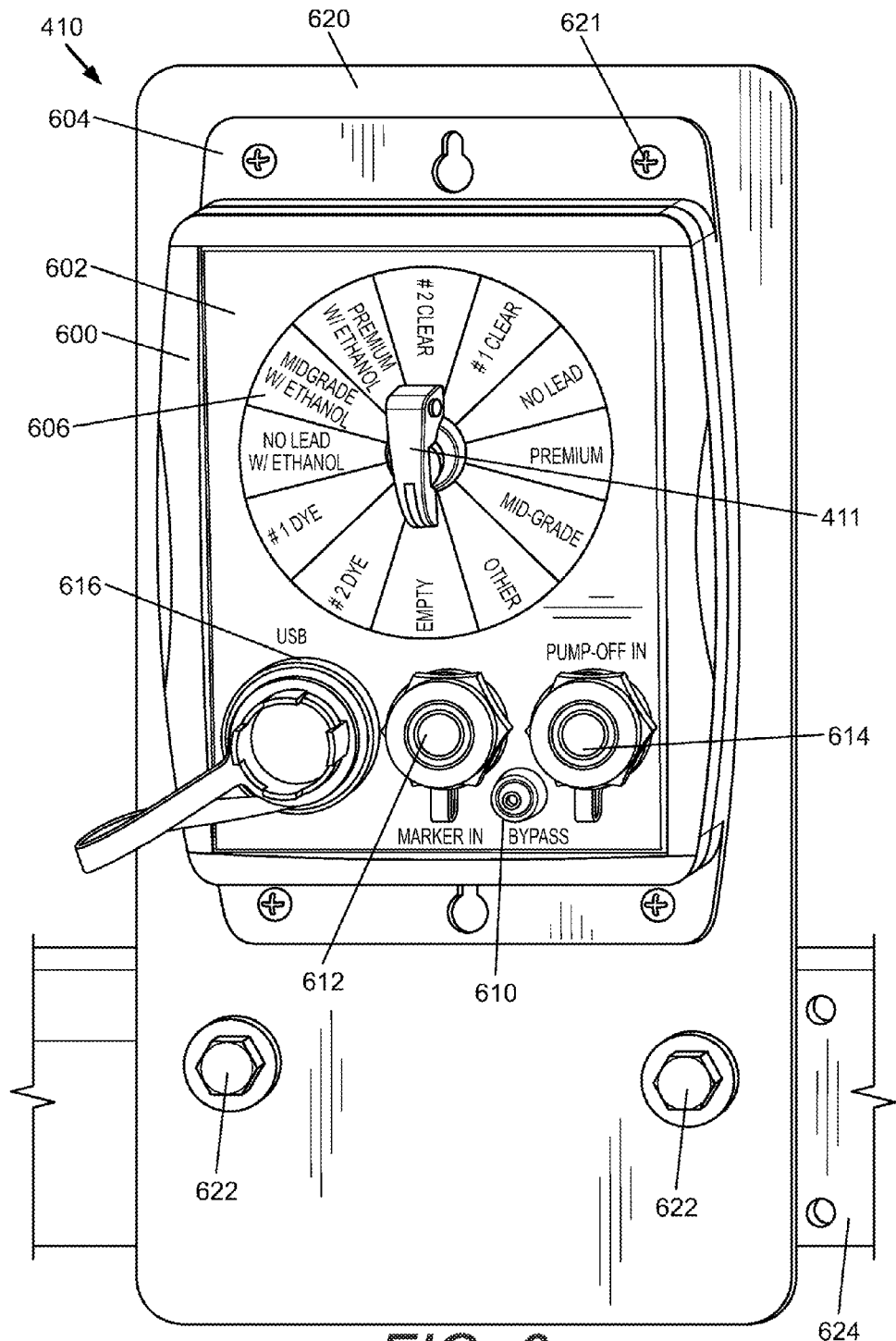
FIG. 6 is a schematic front perspective view of an example master product marker of the fuel transportation system shown in FIG. 1.

Various alternative fuel type selectors 411 are included in other embodiments. For example, some embodiments include an electronic, rather than a mechanical, interface panel for receiving fuel type selections from the user. As one example, the interface panel includes a plurality of light sources, such as light emitting diodes arranged in the panel. Each light source represents one of the various possible fuel types. Fuel type labels are arranged adjacent to each light source (such as with an adhesive label) to show what fuel type is associated with each light source. Examples of fuel types are shown in FIG. 6 and described above. The interface panel also includes one or more input devices, such as up and down buttons that are used to select the appropriate fuel type. A single light source is illuminated at a time, and the selected light source is advanced each time an up or down button is selected by the operator. In one specific embodiment, the up and down buttons are made of one or more membrane-type switches. As discussed above, the fuel type selector 411 is configured to generate a signal that identifies the selected fuel type. In some embodiments the signal includes a very small current, such as a microvolt current. In one example the fuel type is identified by a resistance (or voltage drop across the resistance). In another example, the fuel type is identified by a digital identifier, such as a binary code. An alphanumeric code is used in some embodiments.

Some embodiments include a sleeve configured to receive a printed card. The printed card is visible through a transparent window of the product marker 410. The card includes fuel type identifiers printed thereon that match up each light source to a particular fuel type. The card can be easily removed and replaced with a different card if a different set or arrangement of fuel types is desired.

Slave product markers 412 are communicatively coupled to master product marker 410. Delivery of fuel from containers 402 and 404 to delivery tanks 432 and 434 can proceed in a similar manner to the delivery of fuel from container 400 to delivery tank 430. In some embodiments, fuel delivery from containers, 402, and 404 is performed simultaneously using the multiple product markers 410, 412, and 414. In other embodiments, fuel delivery is performed from one container 400, 402, or 404 to one delivery tank at a time. In these embodiments, only one fuel hose and only one marker cable may be needed, although other embodiments may use multiple fuel hoses and/or multiple marker cables.

As described above, fuel type selectors 411, 413, and 415 should be set to empty during or after the unloading of the respective containers 400, 402, or 404. The fuel hoses 460, 462, and 464 and marker cables 470, 472, and 474 are disconnected after unloading has been completed. The product markers 410, 412, and 414 detect when unloading has completed by the closing of the internal valve and confirm that the fuel type selectors are set to empty. If not, an alarm is initiated to remind the operator to adjust the fuel type selectors 411, 413, and/or 415.

Figure 5:
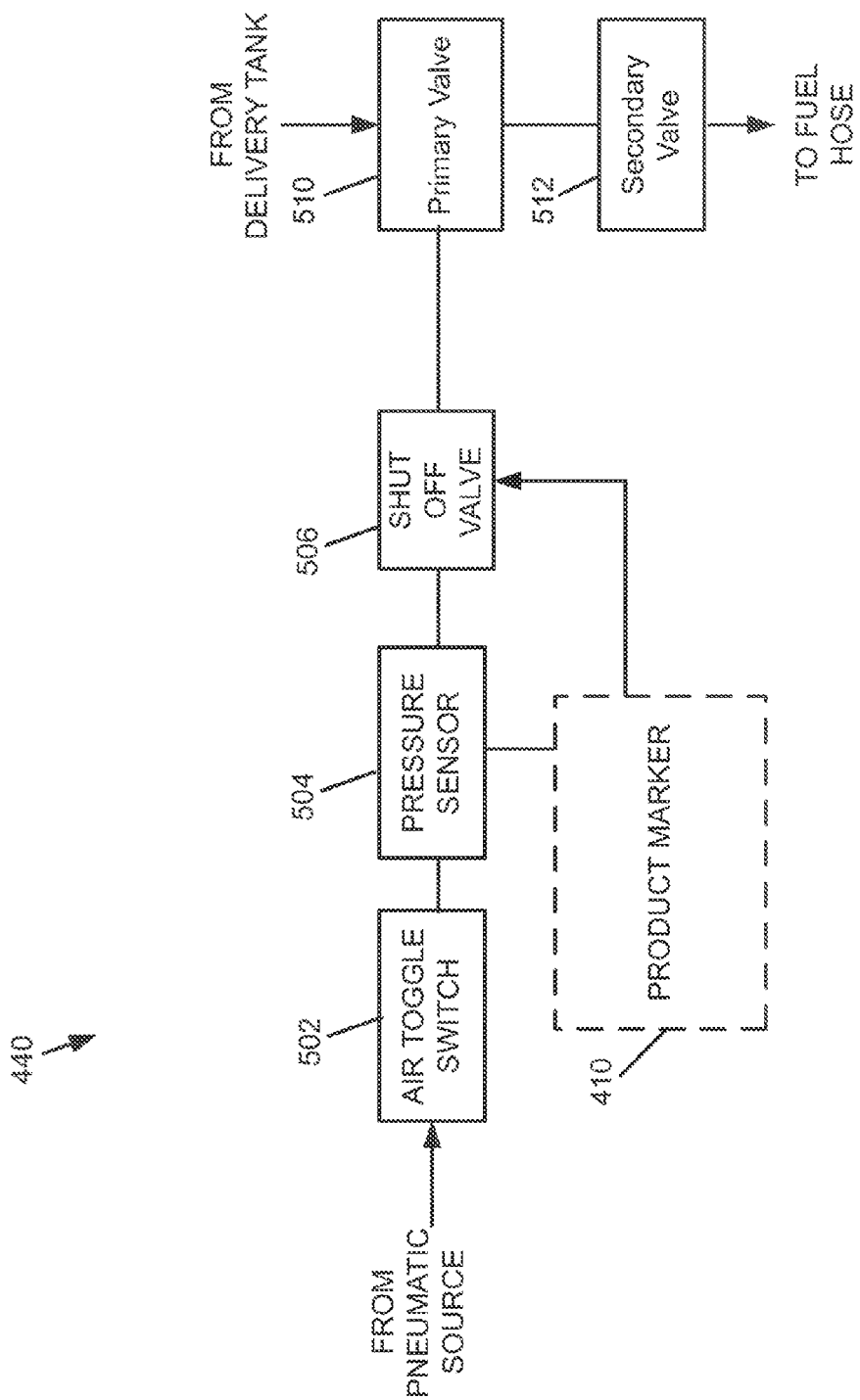
FIG. 5 is a block diagram of an example flow control system of the fuel transportation system shown in FIG. 1.

FIG. 5 is a block diagram of an example flow control system 440. In this example, flow control system 440 includes air toggle switch 502, pressure sensor 504, shut off valve 506, primary valve 510, and secondary valve 512. Flow control system 440 controls the flow of fuel from a delivery tank and to the respective fuel hose. Flow control system 440 is coupled to product marker 410.

Fluid from a delivery tank must pass through both primary valve 510 and secondary valve 512 before it is delivered to a fuel hose (and ultimately to a delivery tank connected to the fuel hose). In some embodiments primary valve 510 is a pneumatically controlled valve and secondary valve 512 is a manual mechanical valve. Primary valve 510 is normally closed. To open primary valve 510, pressurized air is supplied to the primary valve 510.

Air toggle switch 502 is an actuator that can be switched by an operator to initiate a fuel transfer. In this example, the air toggle switch passes pressurized air from a pneumatic source when it is actuated. The pressurized air passes through a pressure sensor 504 and shut off valve 506 (which is normally open) to primary valve 510. When the air toggle switch is activated, the pressure sensor 504 detects the rise in pressure and an electrical signal is sent to the product marker 410. The product marker 410 then verifies that the fuel types match.

If the product marker 410 detects a mismatch of fuel types, the product marker 410 takes precautionary action, such as by initiating an alarm. By initiating the alarm shortly after the air toggle switch 502 is actuated, the product marker 410 alerts the operator to the condition before the secondary valve 512 is actuated, so that fuel is not unloaded.

Some embodiments of flow control system 440 further include shut-off valve 506. Shut-off valve 506 is positioned along the pneumatic delivery line between the air toggle switch 502 and the primary valve 510. Shut-off valve 506 is also electrically coupled to product marker 410. An example of a shut-off valve is a normally open solenoid that, when activated, pinches off the pneumatic delivery line. If a fuel type mismatch is detected by product marker 410, product marker 410 activates shut-off valve 506. In doing so, the pressurized air is cut off from the fuel control valve. As a result, the primary valve 510 is closed to prevent the unloading of fuel from the container to the delivery tank.

In an alternate embodiment, shut-off valve 506 is normally closed such that fuel cannot be delivered. Shut-off valve 506 is opened only after a fuel match has been verified or after a manual override has been requested by the operator.

If the product marker 410 determines that the fuel types match, precautionary action is not necessary. As a result, the shut off valve 506 does not inhibit the flow of air to primary valve 510. As a result, when the operator opens secondary valve 512, fuel is transferred from the delivery tank, through the fuel hose, and to the appropriate delivery tank.

Some embodiments of flow control system 440 do not include a pneumatic source. In such embodiments the primary valve 510 is controlled by a manual switch. A sensor can be used to detect the movement of the manual switch to alert product marker 410 that the primary valve 510 has been opened. If a fuel type mismatch is detected, product marker 410 can alert the operator before the secondary valve 512 is opened.

FIG. 6 is a schematic front perspective view of an example master product marker 410 connected to a tanker truck by coupling plate 620. Master product marker 410 includes a housing 600 having a cover portion 602 and a body portion 604. Master product marker 410 also includes fuel type identifiers 606, fuel type selector 411, bypass actuator 610, marker cable input port 612, pump-off input port 614, and computing device port 616.

In this example, master product marker 410 is connected to a chassis of a tanker truck by a coupling plate 620 and one or more fasteners 622. The housing 600 of master product marker 410 is supported by and connected to the coupling plate 620, such as by one or more fasteners 621.

Figure 7:
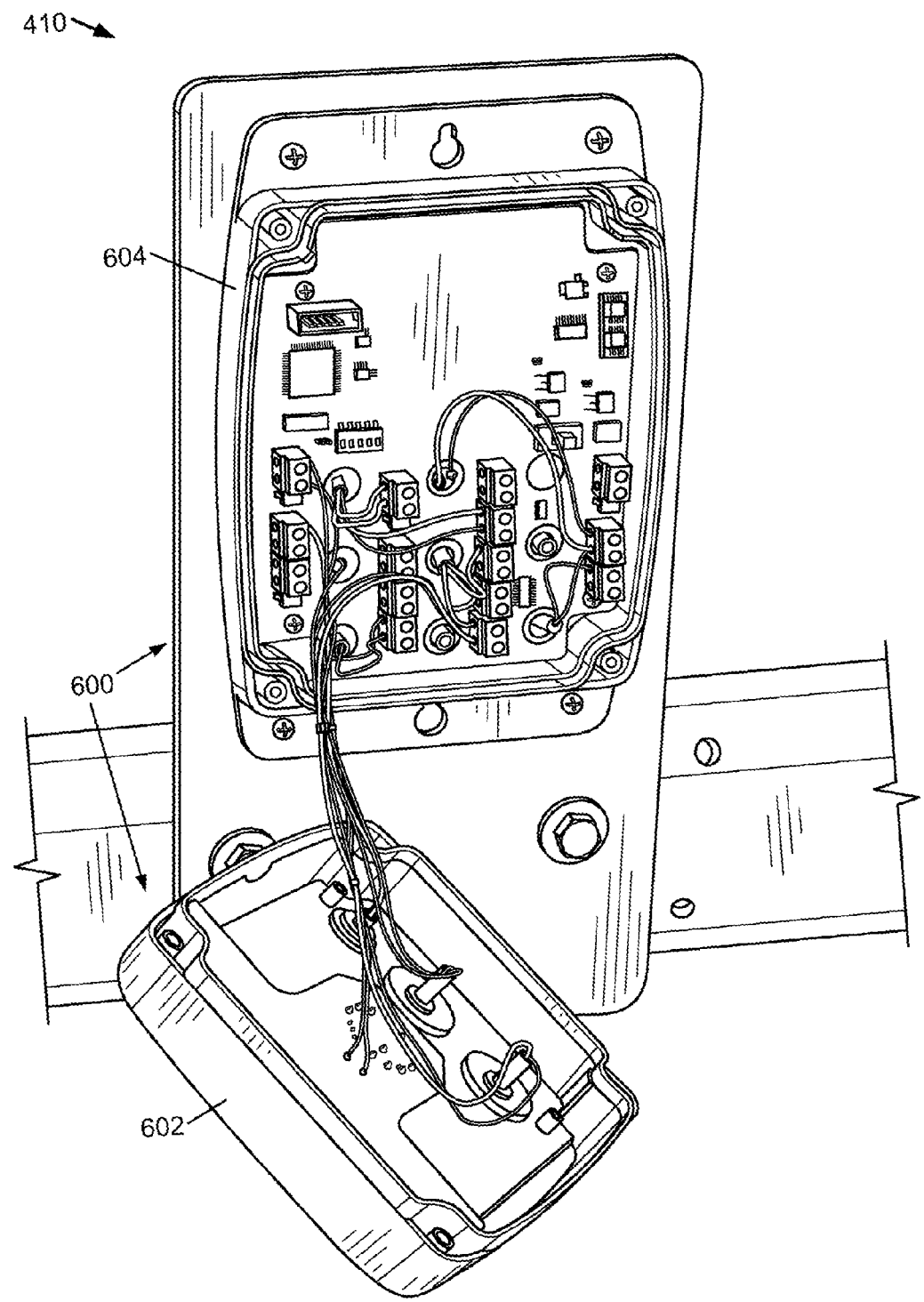
FIG. 7 is another schematic front perspective view of the master product marker shown in FIG. 1 having a cover portion removed.

Housing 600 includes body 604 and a removable cover 602 (shown removed in FIG. 7). A face of cover 602 includes a plurality of fuel type identifiers 606, including an empty indicator, that identify some of the possible types of fuel that may be contained within the respective container of the tanker truck. Although FIG. 6 illustrates one exemplary set of fuel type identifiers, any other fuel type (or other liquid) identifiers can be used as desired. Fuel type selector 411 is connected through cover 602 to identify one of the fuel types of fuel type identifiers 606. In this example, fuel type selector 411 is a multi-position rotary switch.

Bypass actuator 610 is also coupled to the face of cover 602. In this example, bypass actuator 610 is a waterproof depressible button.

A marker cable can be connected to master product marker 410 at either marker cable input port 612 or at pump-off input port 614, depending on the desired mode of operation as discussed in more detail herein. In embodiments utilizing wireless connection, connection of the marker cable is not necessary.

A computing device can also be connected to master product marker 410 through computing device port 616. Examples of computing device port 616 include a USB port, a serial communication port, or other data communication port. Some embodiments include a wireless communication device for communicating with a coupling device. The coupling device can be used for example, to read logs shared in many of the marker product marker 410 or to change a pump setting or update a pump software.

As discussed in more detail herein, some embodiments utilize wireless communication. In such embodiments, wired communication ports, such as marker cable input port 612, pump-off input port 614, and computing device port 616 may not be included. However, in some embodiments the product marker 410 is configured for both wired and wireless communication.

FIG. 7 is another schematic front perspective view of the example master product marker 410, with the cover portion 602 removed from body portion 604. Housing contains the electronic circuitry of product marker 410, such as an electrical circuit board, various electrical components, terminal blocks, and connectors. In this example, wires are used to connect components connected to the cover portion 602 to other components to allow cover portion 602 to be removed to permit an operator or technician to access the components within housing 600 for programming or repair.

Figure 8:
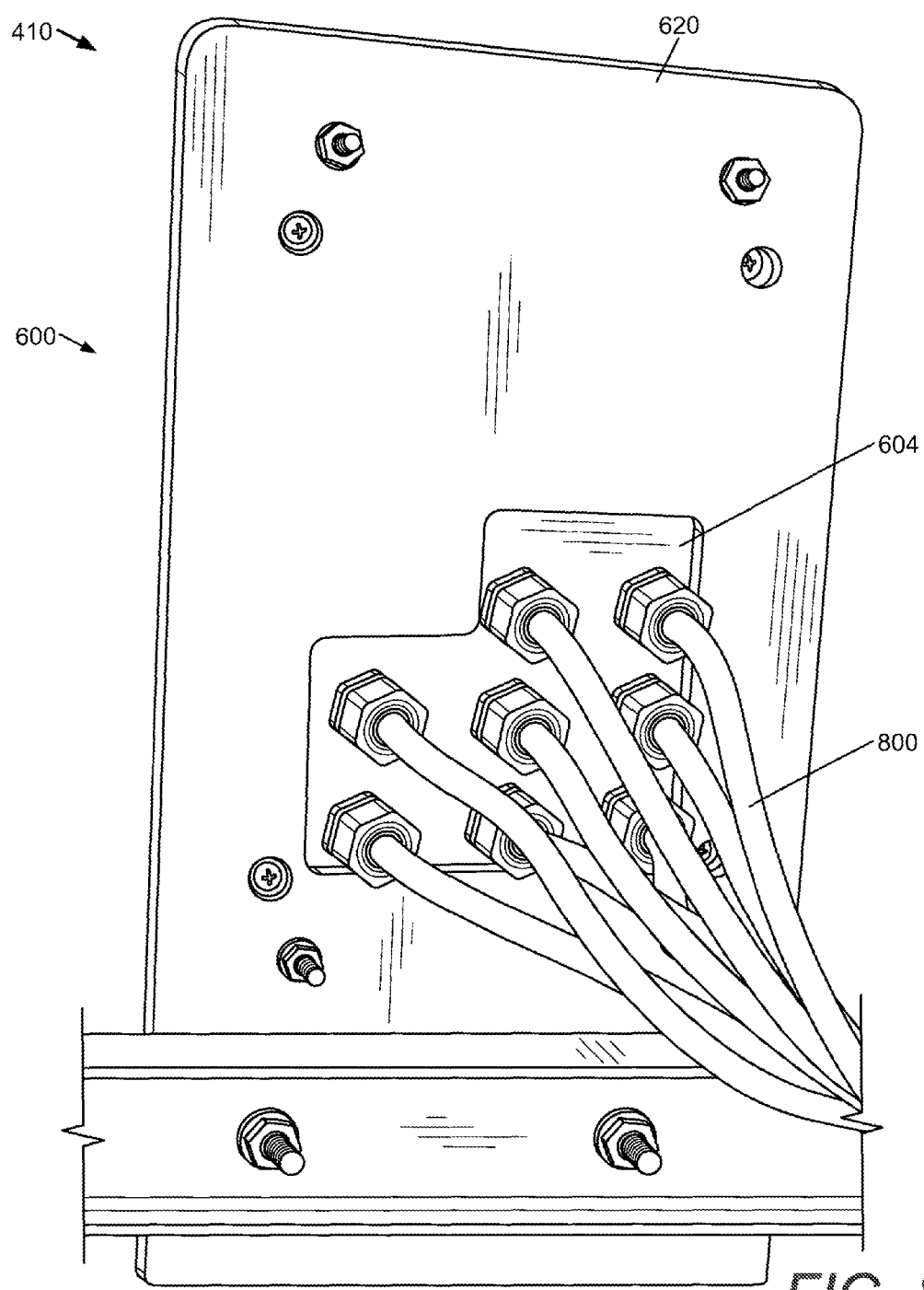
FIG. 8 is a schematic rear view of the master product marker shown in FIG. 6.

FIG. 8 is a schematic rear view of the example master product marker 410, including housing 600 with body 604. An access region is formed in coupling plate 620 to permit access to connection ports in the rear side of housing 600. A plurality of communication wires or conduits 800 connect with master product marker 410 through the access region.

Figure 9:
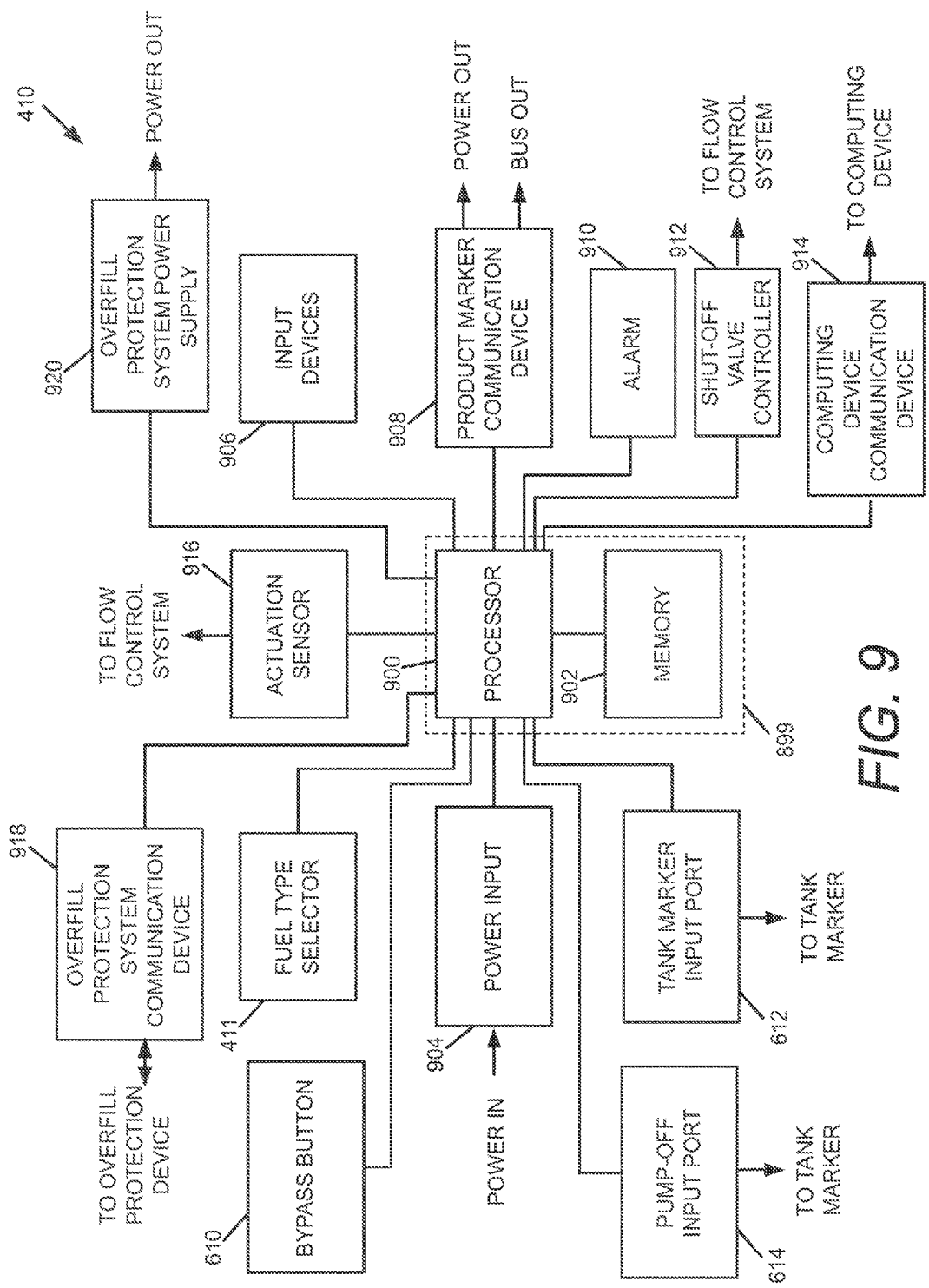
FIG. 9 is a schematic block diagram of the master product marker shown in FIG. 6.

FIG. 9 is a schematic block diagram of an example master product marker 410. In this example, master product marker 410 includes fuel type selector 411, bypass actuator 610, tank marker cable input port 612, pump-off input port 614, control system 899 (such as including at least processor 900 and memory 902), power input 904, input devices 906, product marker communication device 908, alarm 910, shut-off valve controller 912, computing device communication device 914, overfill protection system communication device 918, and overfill protection system power supply 920.

In an example embodiment, control system 901 includes at least a processor 900 and memory 902. Processor 900 is a processing device capable of data communication with memory 902. In some embodiments memory 902 includes instructions, which when executed by processor 900, cause the control system 899 to perform one or more of the operations, processes, methods, features, or functions described herein. For example, in some embodiments the comparing, determining, computing, or other operations discussed herein are performed by control system 901. In some embodiments control system 899 is a control system device. Further, some embodiments of control system 899 include additional components. For example, in some embodiments control system 899 includes one or more input interface devices for receiving inputs, one or more output interface devices for providing outputs, and can further include other electronic or mechanical devices.

Processor 900 controls the operation of product marker 410. More specifically, processor 900 is typically a device that processes a set of instructions. One example of processor 900 is a microprocessor. Alternatively, various other processing devices may also be used including central processing units ("CPUs"), microcontrollers, programmable logic devices, field programmable gate arrays, digital signal processing ("DSP") devices, and the like. Processing devices may be of any general variety such as reduced instruction set computing ("RISC") devices, complex instruction set computing devices ("CISC"), or specially designed processing devices such as an application-specific integrated circuit ("ASIC") device.

As illustrated in FIG. 9, some embodiments of processor 900 are electrically connected or coupled to some or all of the components of product marker 410 to communicate with and control the components. Some embodiments include additional devices between the components and the processor, such as a driver, controller, terminal or connector block, electrical wires or traces, or other devices or transmission lines.

Memory 902 is accessible to processor 900 to store digital data. Examples of memory 902 include volatile (such as RAM), and nonvolatile (such as ROM and flash) memory. In some embodiments, memory 902 is part of processor 900, while in other embodiments, memory 902 is separate from or in addition to that of processor 900. In some embodiments memory 902 stores program instructions, such as an operating system, software application, other program modules, or program data. In some embodiments memory 902 stores logged data regarding the operation of fuel mix reduction system 108. Any data can be logged by the product markers, including an alarm condition, how the alarm condition was resolved, a successful unload, a bypass selection or other manual override, the content and status or change in status of each container, a loading of a container, the status of a fuel type selector, time and date of an event, or any other known data.

In yet other embodiments, memory 902 is computer storage media including volatiles and nonvolatile, removable and non-removable media implemented in any method or technology for storage of information such as computer readable instructions, data structure, program modules, or other data. Computer storage media includes, but is not limited to RAM, ROM, EEPROM, flash memory or other memory technology, CDROM, DVD, or other optical storage, magnetic cassettes, magnetic tape, magnetic disk storage, or other magnetic storage devices, or any other medium that can be used to store the desired information and that can be accessed by processor 900. More than two memory 902 devices or types of memory 902 are included in some embodiments.

Power input 904 receives power from an external power supply. In some embodiments, the external power supply is a battery of the tanker truck 104, such as a 12V DC power supply. Other embodiments receive an AC power supply, such as from a power inverter of the tanker truck 104. Power input 904 can include a fuse, filtering circuitry, power converter circuitry (such as AC/AC, AC/DC, DC/AC, or DC/DC), a connector or terminal block, or other devices or circuitry.

Input devices 906 are provided in some embodiments to permit an operator or other user to provide an input to product marker 410. Examples of input devices include dip switches, buttons, switches, wireless communication devices, or other devices capable of receiving an input from a user or device. In some embodiments the input devices 906 determine one or more operating parameters or modes of the product marker 410.

Product marker communication device 908 is provided in some embodiments to allow product marker 410 to communicate with other product markers (e.g., slave product markers). In one example, communication device 908 is a bus controller that communicates across a two-wire, half-duplex, multipoint serial communications channel. In some embodiments communication across the bus is according to a standard communication standard, such as the EIA-485 (formerly known as the RS-485 standard), administered by the Telecommunications Industry Association. Other embodiments include other wired or wireless communication devices or use other communication standards or protocols.

Alarm 910 is a device configured to alert an operator. In some embodiments, alarm 910 is a sound generator, such as a horn, bell, whistle, speaker, or other device capable of generating a sound. Other embodiments generate other outputs that are perceptible to a user, such as a visual signal (e.g., a light, LED, etc.), a vibration generator, or any other device capable of generating a perceptible output. In yet other embodiments, alarm 910 is a communication device, such as a device capable of sending a message to another person or device. Examples of such messages include a text message, a phone call, an e-mail, a pager alert, or other messages.

Some embodiments include multiple alarm levels, each alarm level designed to convey a different message to the operator. For example, some embodiments include a fuel mismatch alarm, a marker setting alarm, wiring problem alarm, system initialization sound, and a bypass confirmation. The fuel mismatch alarm is a very loud sound that is generated to warn an operator of a potential fuel mismatch condition before unloading of fuel occurs. The marker setting alarm is a less intense sound that is generated when the product marker 410 determines that the product marker has not been set to "empty" after a fuel unload. The wiring problem alarm is a high level alarm that is initiated when wiring problems are detected. For example, if a product marker or marker cable are determined to be not connected, the wiring problem alarm is initiated in some embodiments. Similarly, if the master product marker 410 detects that one of the slave product markers is not connected or inaccessible for a period of time (such as one second), the wiring problem alarm can be sounded. Additionally, in some embodiment the product marker may also operate to shut off power to the overfill protection system to prevent filling until the slave product marker becomes available. This can be bypassed with the manual bypass switch in some embodiments.

In addition to these alarms, system initialization sounds are emitted as the product marker 410 initializes. For example, if no problems are found the alarm 910 emits two short pulses of sound. If a problem is detected another alarm can be sounded, such as the wiring problem alarm. An additional sound is emitted in some embodiments when an operator uses the manual bypass switch. For example, one short pulse of sound is emitted when the bypass timeout has been activated.

Shut-off valve controller 912 is a device configured to selectively prevent fuel from being unloaded. An example shut-off valve controller 912 described herein is a pneumatic valve for turning off a pneumatic system that supplies pressurized air to in a flow control system. Other embodiments utilize other valves or devices capable of preventing fluid flow.

Computing device communication device 914 is a device that communicates with an external computing device. An example of communication device 914 is a serial port and serial port communication controller. Other embodiments include other communication devices, such as a USB port (e.g., computing device port 616 shown in FIG. 6) and communication controller, or a wireless communication device. In some embodiments, an operator or other user is able to communicate with product marker 410 using an external computing device, not shown in FIG. 9. The external computing device may be a personal computer, a handheld computer, or other computing device (cell phone, personal digital assistant, smart phone, etc.). The external computing device can be used to program product marker or to adjust operational settings (e.g., to change settings such as the delay period before the product marker system wakes after the overfill protection system is disabled). Further, in some embodiments the external computing device is used to transfer data with product marker 410, such as to download logged data from product marker 410.

Actuation sensor 916 is a device that detects that a fuel unload has been initiated. In one example, the actuation sensor 916 is coupled to a flow control system, such as system 440 shown in FIG. 5. One example of an actuation sensor 916 is an air switch that detects when pressure in a pneumatic system rises. Another example of an actuation sensor 916 is a manual switch, such as on units without pneumatic controls. When that occurs, the actuation sensor 916 communicates with processor 900 to alert processor 900.

Tank marker input port 612 is an input port for connection of a marker cable plug, such as during the method 1400 described with reference to FIG. 14.

Pump off marker input port 614 is another input port for connection of a marker cable plug, such as when operating in a pump off mode. The pump off mode is illustrated and described herein with reference to FIG. 16.

Overfill protection system communication device 918 is a device that is configured to communicate with an overfill protection system (such as the overfill protection system 206, shown in FIG. 2).

Overfill protection system power supply 920 supplies power to the overfill protection system (such as overfill protection system 206, shown in FIG. 2). Any necessary power output can be used. In some embodiments overfill protection system power supply 920 can be selectively operated. For example, if product marker 410 determines that a container should not be loaded with fuel, product marker 410 can deactivate power supply 920, which in turn deactivates the overfill protection system.

Figure 10:
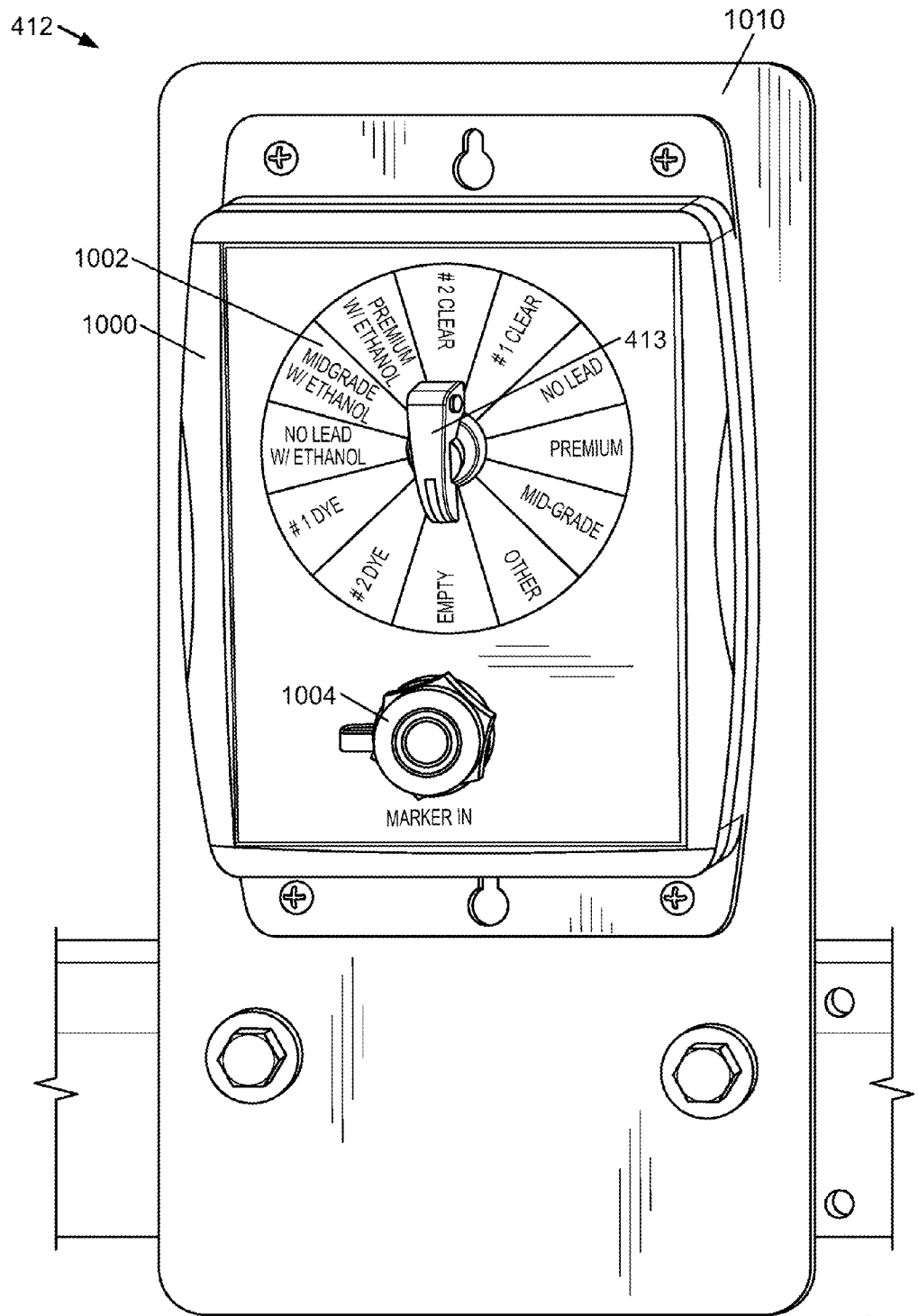
FIG. 10 is a schematic front view of an example slave product marker of the fuel transportation system shown in FIG. 1.

FIG. 10 is a schematic front view of an example slave product marker 412. Slave product marker 412 is similar to the master product marker in some respects, and such details will not be repeated in detail herein. In this example slave product marker 410 includes a housing 1000, fuel type identifiers 1002, fuel type selector 413, and marker cable input port 1004. Slave product marker 412 is connected to a chassis of a tanker truck by a coupling plate 1010 in some embodiments. A rear side of slave product marker 412 is also similar to that of master product marker 410, shown in FIG. 10.

Various alternative configurations of the fuel type selector 413 are used in other embodiments, such as discussed herein with reference to master product marker 410.

Some embodiments utilize wireless communication, as discussed herein. In such embodiments, a wired communication port (such as cable input port 1004) may not be needed.

In some embodiments, slave product marker 412 operates to route information to the master product marker 410. For example, upon initiation of an unload operation, slave 412 detects the unload and sends a signal to master product marker 410 alerting the master product marker 410 that an unload has been initiated. Master product marker 410 then requests the current fuel type from slave product marker 412 and compares the received fuel type to a fuel type of the tank marker.

Figure 11:
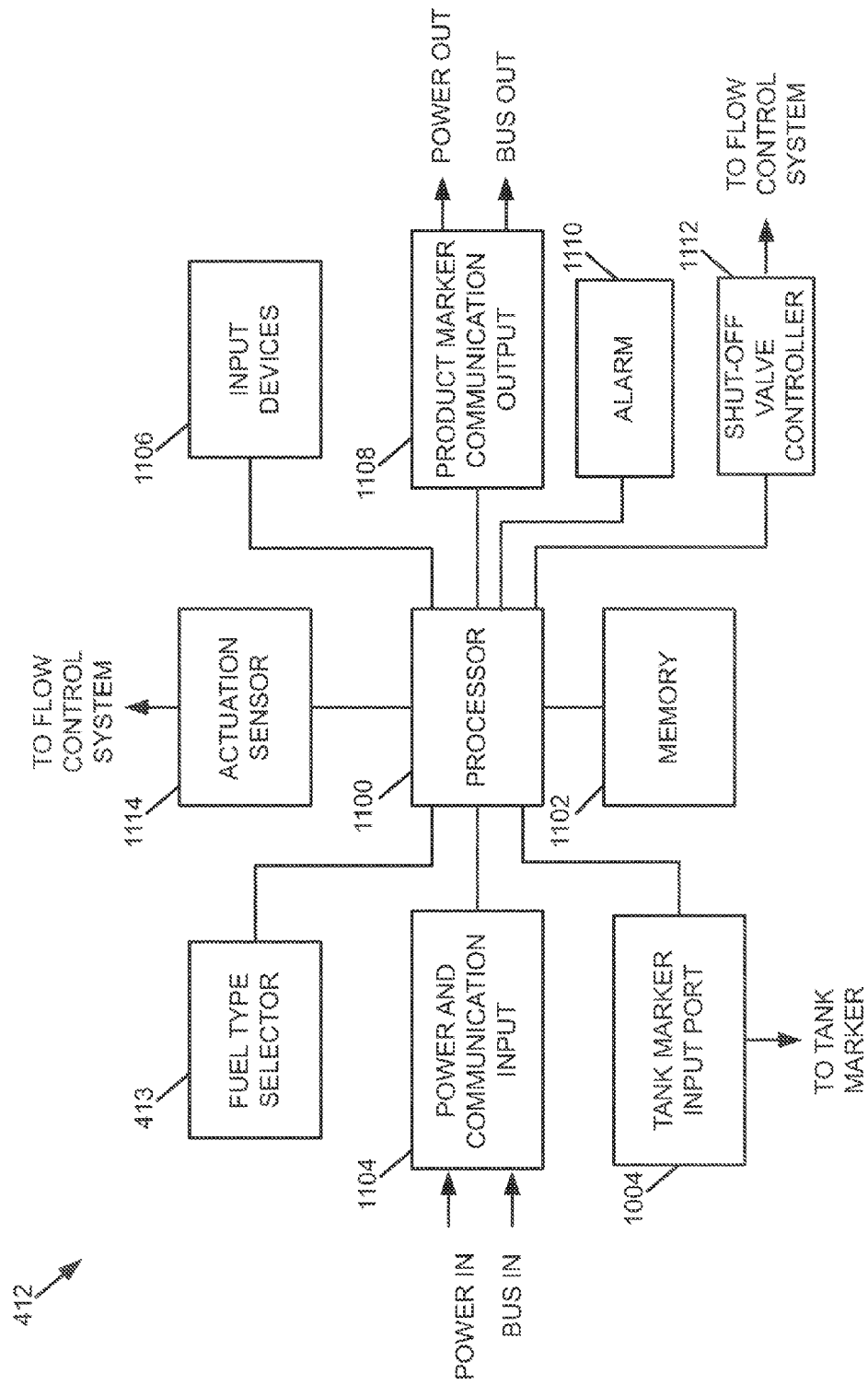
FIG. 11 is a schematic block diagram of the slave product marker shown in FIG. 10.

FIG. 11 is a schematic block diagram of an example slave product marker 412. In this example, the slave product marker 412 is similar to the master product marker, but includes several fewer components. Such similar details will not be repeated herein. Additional slave product markers are included in some embodiments, such as slave product marker 414, which need not be separately described in further detail herein.

In this example, slave product marker 412 includes fuel type selector 413, tank marker input port 1004, processor 1100, memory 1102, power and communication input 1104, input devices 1106, product marker communication output 1108, alarm 1110, shut-off valve controller 1112, and actuation sensor 1114.

Slave product marker receives power and communicated messages with power and communication input 1104. The input 1104 is electrically connected to a power supply of either the master product marker (e.g., 410) or another slave product marker (e.g., 414).

In this example, communication between product markers occurs over a communication bus. Input communications are received at power and communication input 1104. Output communications are sent with product marker communication output 1108.

In some embodiments, slave product marker 412 can include fewer components and perform fewer functions than master product marker 410 (e.g., FIG. 9), because such functions are handled by master product marker 410. For example, only one pump-off connector is included in some embodiments of product marker system 110 (shown in FIG. 1), and such connector is provided on the master product marker 410.

Some embodiments include more or fewer components. For example, in some embodiments the alarm and/or the shut-off valve controller are included only in a master product marker 410 and not in the slave product marker 412.

Figure 12:
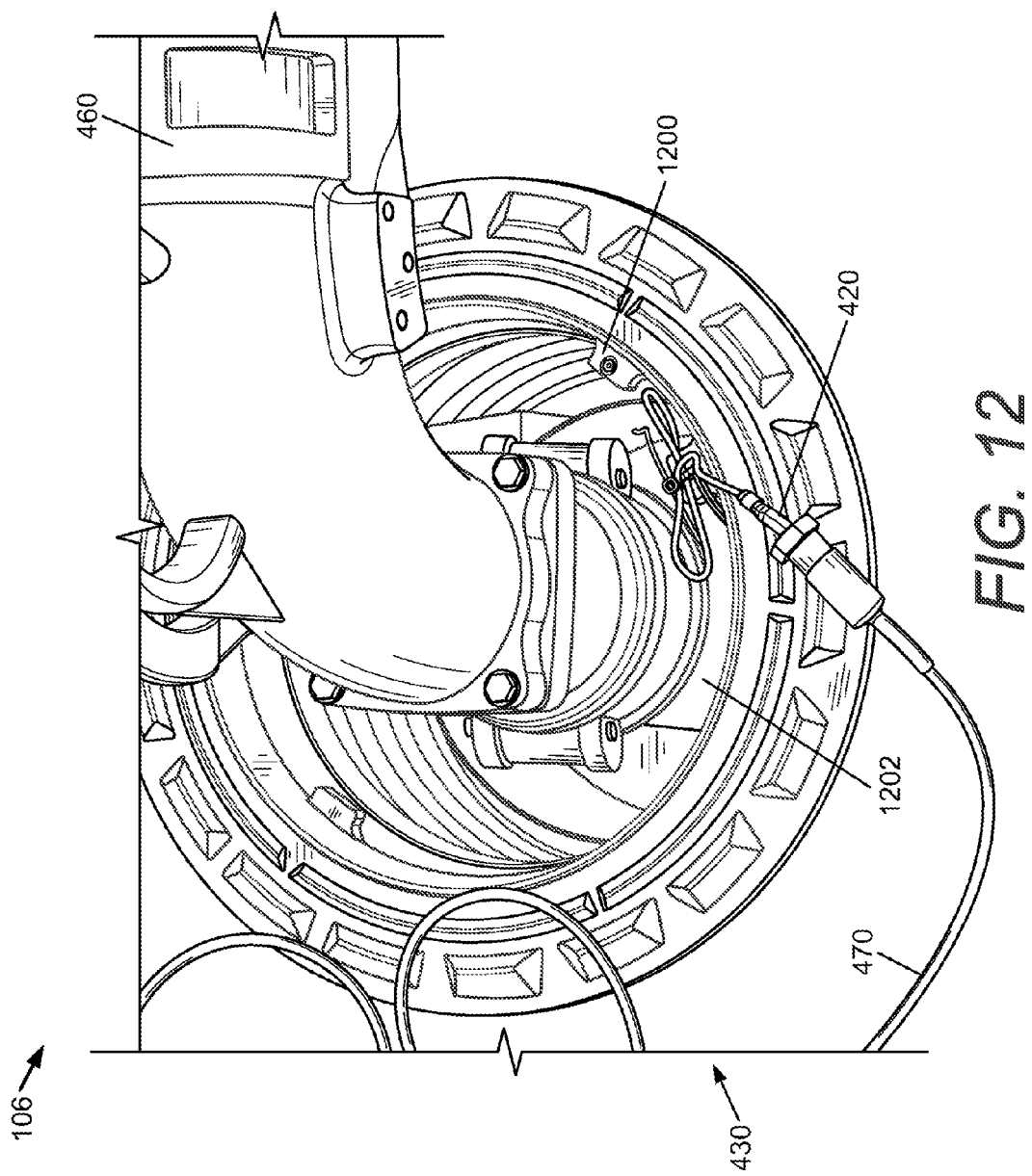
FIG. 12 is a schematic diagram of another portion of the fuel transportation system shown in FIG. 1.

FIG. 12 is a schematic diagram of a portion of an example drop off location 106 having a fuel hose 460 of a tanker truck (not shown) connected and prepared to unload fuel into a delivery tank 430. In this example, drop off location 106 includes an underground delivery tank 430. An access port 1200 of the delivery tank 430 is shown. Typically the access port 1200 is covered by a cap (not shown) when not in use. The access port 1200 is opened by removing the cap. Within the access port 1200 is a fuel hose port 1202 for connection of fuel hose 460 and a tank marker 420 for connection of marker cable 470. The tank marker 420 is configured to identify a type of fuel that should be unloaded and stored in delivery tank 430. In some embodiments drop off location 106 includes multiple tanks and an additional access port for each tank.

In one embodiment, tank marker 420 includes a resistor and a connector plug electrically connected to the terminals of the resistor. The tank marker 420 also includes a ground wire. The ground wire is configured to be physically connected to the access port of delivery tank 430, such as by a ground lug. The ground lug and wire both physically connect the tank marker to the access port and ensure that the tank marker remains at a ground potential. The connector plug is configured to mate with one end of the marker cable 470 as shown.

In some embodiments the resistance of the resistor in the tank marker 420 identifies the type of fuel that is to be stored in delivery tank 430. The product marker applies a voltage across the resistor and measures a resulting current through the resistor. Alternatively, the product marker applies a current through the resistor and measures a resulting voltage across the resistor. Knowing the current and the voltage, the product marker can compute the resistance using Ohm's Law. Once the resistance is known, a lookup table stored in memory of the product marker is used to identify the type of fuel associated with that resistance.

In some embodiments, a range of resistance values are associated with each fuel type. For example, unleaded fuel can be associated with resistance values in a range from 10 ohms to 50 ohms, and diesel fuel can be associated with resistance values in a range from 50 ohms to 100 ohms. These ranges are just examples, and any range can be used for any fuel type. Preferably the ranges are set so that the actual resistance values are approximately in the middle of the ranges. This allows the system to account for small variations in actual resistance values or to account for small errors in resistance measurements by the product markers.

In some embodiments resistance values are selected to account for temperature variations, wire length, and other tolerances to distribute the uncertainty through the entire measurement range. Further, in some embodiments resistance ranges are separated from each other to help reduce the chance of cross-over. Tank marker 420 operates to identify a type of fuel associated with the respective delivery tank 430. Any device configured to identify the fuel type can be used. For example, some other possible embodiments utilize an RFID tag (that communicates wirelessly with a product marker), an optical device that generates an optically perceptible identification signal or an analog or digital communication device that can generate an analog or digital identification signal.

Figure 13:
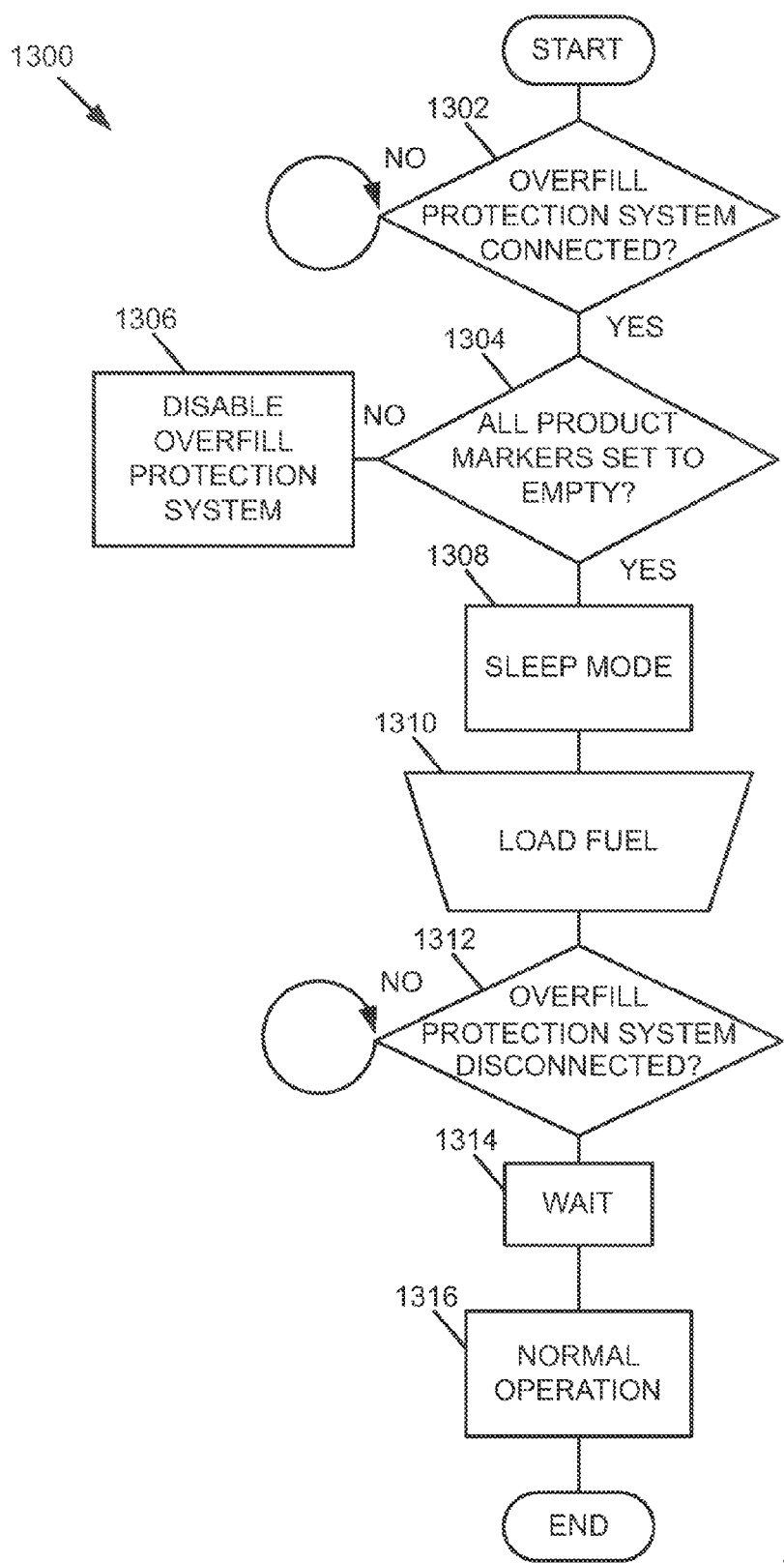
FIG. 13 is a flow chart illustrating an example method of loading a tanker truck.

FIG. 13 is a flow chart illustrating an example method 1300 of loading a tanker truck. This example of method 1300 includes operations 1302, 1304, 1306, 1308, 1310, 1312, 1314, and 1316.

Operation 1302 is first performed to determine whether an overfill protection system has been connected. If not, operation 1302 continues to monitor for the connection of the overfill protection system until it is connected.

Once the overfill protection system has been connected, operation 1304 is next performed to determine if all product markers are set to empty. If not, operation 1306 is performed to disable the overfill protection system. Because the overfill protection system is needed to transfer fuel into the tanker truck, the transfer is prevented by disabling the overfill protection system. The operator checks the status of the product markers and adjusts the one or more product markers to the empty status, if appropriate.

When all product markers are set to empty, method 1300 continues with operation 1308 in which the product markers enter a sleep mode. The sleep mode is a very low power mode that reduces the chance of a spark occurring during the loading process.

Loading then occurs during operation 1310 and while the master product marker is in the sleep mode. In some embodiments the slave product markers are turned off completely during the sleep mode by turning off the power supplied to the slave product markers.

While in the sleep mode of operation 1308, operation 1312 is also performed. During operation 1312 the master product marker continue to monitor for the disconnection of the overfill protection system.

Once disconnected, operation 1314 is performed to wait for a predetermined period of time. In some embodiments the period of time is configurable by an operator or other user, such as by using an input device or by using an external computing device. The waiting period gives the operator time to disconnect the fuel hose and exit the loading station. During operation 1314 the master product marker remains in the low power sleep mode to continue to reduce the chance of a spark, and slave product markers are still turned off.

After the waiting period of operation 1314 has elapsed, product marker awakes and returns to normal operation. In some embodiments, operation 1316 involves proceeding to operation 1400 as described below with reference to FIG. 14.

Some embodiments of method 1300 include more or fewer operations.

Figure 14:
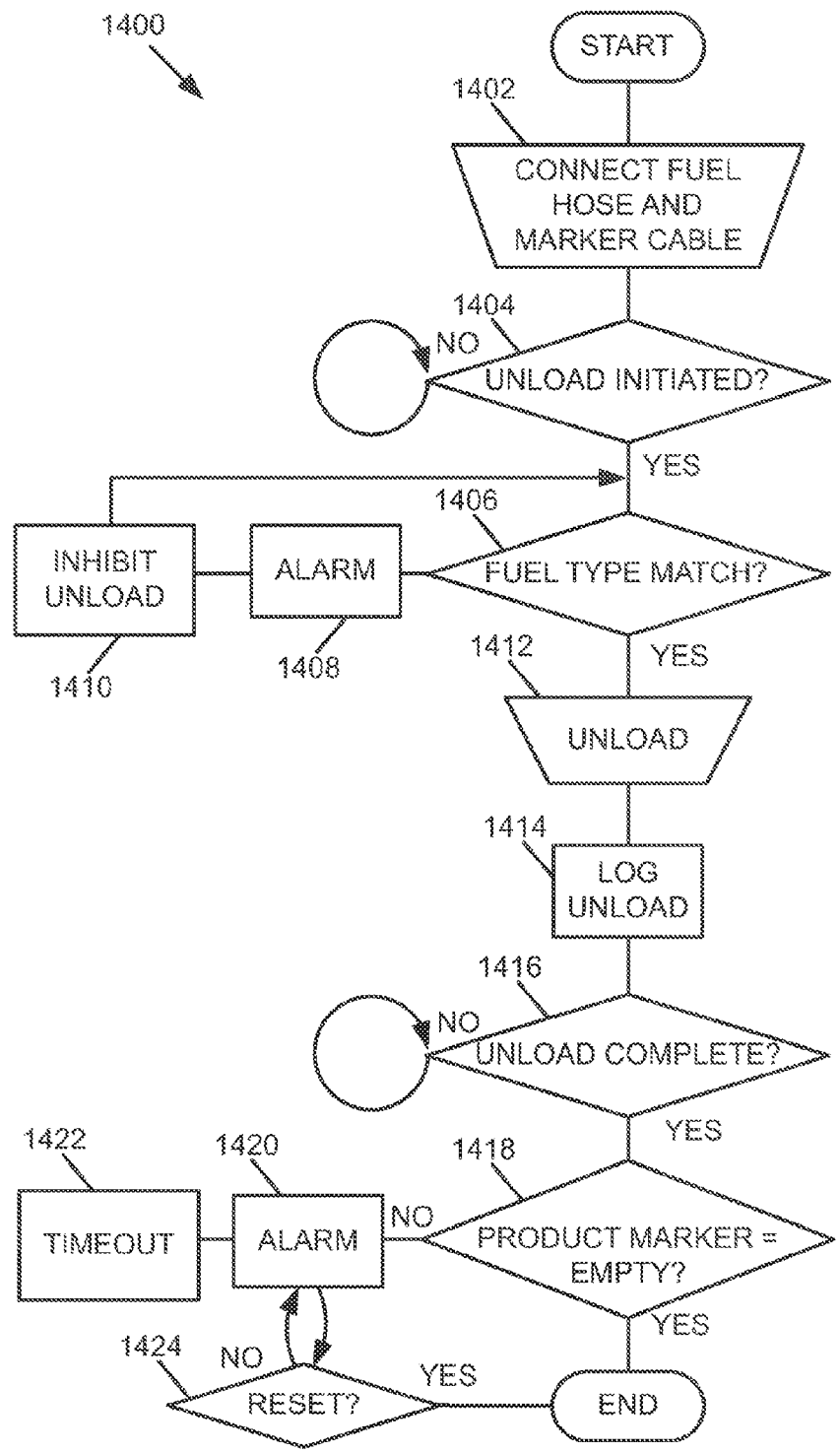
FIG. 14 is a flow chart illustrating an example method of unloading a compartment of a tanker truck into a delivery tank.

FIG. 14 is a flow chart illustrating an example method 1400 of unloading the contents of a compartment of a tanker truck into a delivery tank. In this example, method 1400 includes operations 1402, 1404, 1406, 1408, 1410, 1412, 1414, 1416, 1418, 1420, 1422, and 1424.

Method 1400 begins with operation 1402 during which the operator connects the fuel hose to a delivery tank and marker cable to the associated tank marker. In some embodiments the marker plug is connected to the tank marker input port of the respective product marker. In other embodiments, a marker cable is not used and the connection between the product marker and marker plug is performed with wireless communication.

Operation 1404 is then performed to detect the initiation of the unload. In one example, the unload is initiated when an actuator for a pneumatic system is actuated. In another possible embodiment, the unload is initiated when the operator moves a manual switch, such as in a system that is not pneumatic.

Operation 1406 is then performed to determine whether the fuel types match. More specifically, operation 1406 determines whether the fuel type indicated by the tank marker matches the fuel type indicated by the product marker (e.g., the fuel type selector of the product marker). If not, operation 1408 is performed to initiate an alarm. In addition, or alternatively, operation 1410 is performed to inhibit the unload from occurring.

If the fuel types do match, the unload is allowed to proceed in operation 1412, and data is logged in memory. For example, the time, date, port number, fuel type, alarm status, and internal battery voltage are logged in some embodiments. In some embodiments some or all of the information that is logged is provided by an onboard computing provided by a device. An example of onboard computing device is a PeopleNet system distributed by PeopleNet of Minnetonka, Minn. Another example of an onboard computing device is a Qualcomm system distributed by Qualcomm Inc. of San Diego, Calif.

Operation 1416 is then performed to determine if the unload has completed. In some embodiments the unload is determined to be completed when the internal valve is closed.

Operation 1418 is next performed to determine if the respective product marker has been set to empty. More specifically, some embodiments determine whether the fuel type selector of the product marker is set to empty. If not, operation 1420 is performed to initiate an alarm. In some embodiments alarms are only permitted to continue for a predetermined period of time until a timeout condition occurs, as in operation 1422. In some embodiments an operator can manually reset the alert, such as by selecting a bypass or other input device. If the product marker is correctly set to empty, the alarm is terminated.

If operation 1418 determines that all product markers are set to empty, then method 1400 determines that the unload was successfully completed. In some embodiments the product marker then returns to operation 1300.

Method 1400 illustrates a number of possible logging steps, including log unload operation 1414 and alarm operation 1420. Product markers automatically can log various information throughout the operation of the product marker. Examples of such data include time and date of events (e.g., loading begins, wake up after loading, valve state change, alarms, etc.), contents of containers, identity of delivery tanks, type of fuel identified by a tank marker, global positioning system data, or any other available data. In some embodiments the data is provided by an onboard computing device. The logged data can later be used to generate reports, confirm deliveries, verify procedures are being followed by operators, or a variety of other purposes. In some embodiments the automated data logging reduces the amount of data that an operator must manually record. Data logging is not limited to method 1400, but rather can be performed at any time. Logged data is typically stored in memory of one or more product markers and can subsequently be transferred to another computing device.

Figure 15:
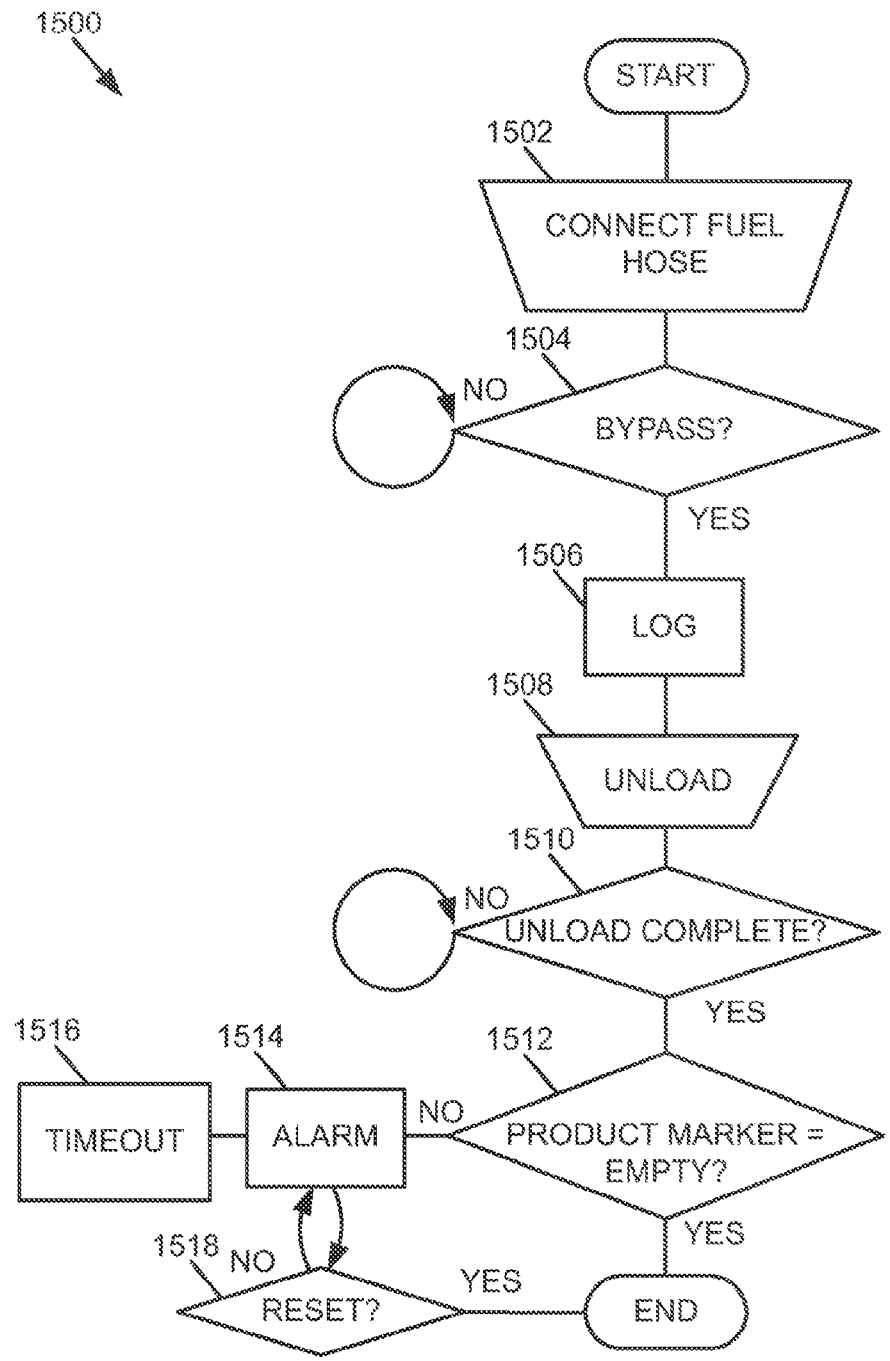
FIG. 15 is a flow chart illustrating another example method of unloading a compartment of a tanker truck into a delivery tank.

FIG. 15 is a flow chart illustrating an example method 1500 of unloading a compartment of a tanker truck when no tank marker is available at the drop off location. Method 1500 includes operations 1502, 1504, 1506, 1508, 1510, 1512, 1514, 1516, and 1518.

Method 1500 begins with operation 1502, during which a fuel hose is connected to the delivery tank.

Operation 1504 is performed to detect the actuation of a bypass button. When the bypass button is actuated, the bypass operation is logged with operation 1506, and the unload is allowed to proceed with the unload in operation 1508 without confirming a fuel type match. This allows an operator to proceed with an unload in a situation where a tank marker has been damaged or has not yet been installed or is otherwise not available. When operating in manual bypass mode, the product marker continues to detect and log all events that occur, but audible alarms are not sounded and the product marker does not act to stop the unloading process.

In some embodiments, the bypass operation is a timed event that begins when a bypass button is actuated. For example, the duration of the bypass operation is a predetermined period of time, which is programmable from five seconds to one hour or more.

Operation 1510 is then performed to determine when the unload has completed. In one example embodiment, operation 1510 determines that the unload has completed by determining that the pre-determined period of time has elapsed since the actuation of the bypass button. In another possible embodiment a sensor is used to detect that the unload has been completed. In another possible embodiment, operation 1510 determines that the unload has been completed by detecting that the overfill protection system 206 has been connected to the fuel loading rack 124, indicating that the tanker truck 104 is now at the pick up location 102. In some embodiments the timed bypass is cut short when the connection to the fuel loading rack is detected thereby resetting the product marker system 110 regardless of the programmed duration of the bypass operation. This prevents the product marker system 110 from remaining in the bypass operation during the next loading operation.

When operation 1510 is completed, operation 1512 is performed to check whether the product marker has been set to empty. If not, operation 1514 is performed to alert the operator until a timeout occurs with operation 1516 or the operator resets the alarm in operation 1518 or correctly sets the product markers to empty in operation 1512.

Similar to the bypass mode of operation illustrated in FIG. 15, some embodiments include a maintenance mode of operation. The maintenance mode is initiated by the mechanic (or other operator) when maintenance needs to be performed on the truck or the product marker system 108. For example, a computing device can be connected to the product marker system 108 (such as through the computing device communication device 914 described herein with reference to FIG. 9). A command can then be sent from the computing device to the product marker system 108 to initiate the maintenance mode. Alternatively, a button or other input device is included in the product marker system to initiate the maintenance mode. When operating in the maintenance mode, the product marker system 108 continues to log events when they occur but does not sound warning alarms and, in the case of a pneumatic system, does not control the internal valve. In this way the maintenance mode allows the necessary maintenance to be performed without interruption. In some embodiments the mechanic communicates to the product marker system 108 (such as through the command from the computing device) the period of time in which the maintenance mode should continue (such as three hours). In other embodiments, the maintenance mode continues until it is manually terminated, such as by sending a second command or by pressing the appropriate button or other input device. In some embodiments the maintenance mode is terminated when the overfill protection system 206 is connected to the fuel loading rack 124. This prevents the product marker system 110 from remaining in the maintenance mode during the next loading operation. After the maintenance mode terminates, the product marker system 108 resumes normal operation.

Figure 16:
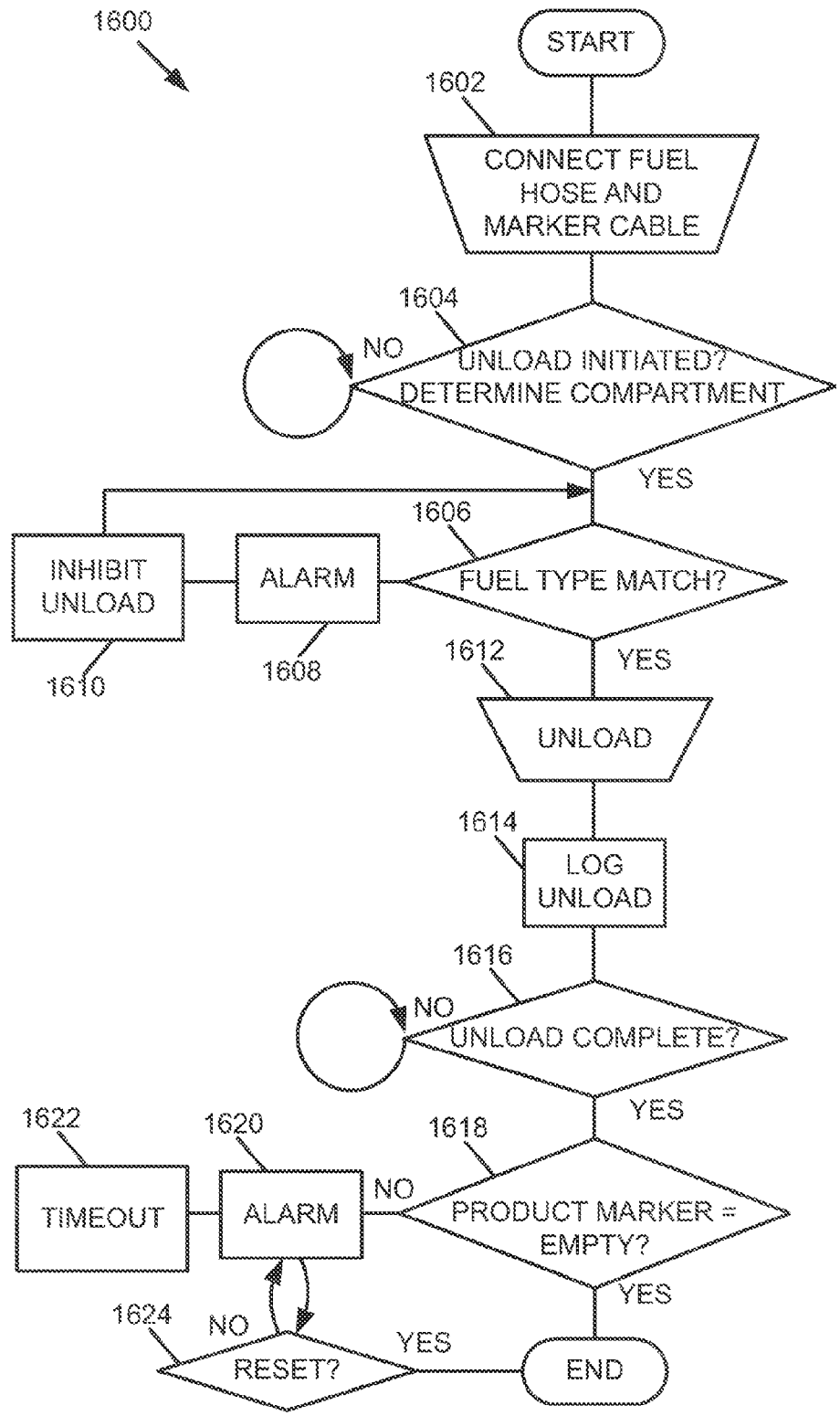
FIG. 16 is a flow chart illustrating another example method of unloading a compartment of a tanker truck into a delivery tank.

FIG. 16 is a flow chart illustrating another example method 1600 of unloading a compartment of a tanker truck into a delivery tank. Method 1600 is an example in which a product marker system operates in a pump off mode. This example of method 1600 includes operations 1602, 1604, 1606, 1608, 1610, 1612, 1614, 1616, 1618, 1620, 1622, and 1624.

Some tanker trucks have fuel compartments that all share a single pump. In this case, a pump off mode can be used to transfer fuel from the containers of the tanker truck to the appropriate delivery tanks. When operating in the pump off mode, only a single marker cable is used for all fuel compartments. Instead of connecting the marker cable to the tank marker input port, the marker cable is connected to the pump off input port of the master product marker.

Method 1600 begins with operation 1602 in which the fuel hose and marker cable are connected. As noted above, in this embodiment the marker cable is connected between the tank marker and the pump off input port of the master product marker, regardless of which container is being unloaded. When the marker cable is connected to the pump off input port, the product marker system operates in the pump off mode.

Operation 1604 is then performed to detect when a download is initiated, and once initiated, to determine which container is going to be unloaded. In some embodiments, the master product marker performs operation 1604 and determines which container is being unloaded by detecting a signal from an air switch, or manual switch, associated with the container.

Operation 1606 is then performed to determine if the fuel type identified by the product marker of the identified container matches the fuel type indicated by the tank marker. If the container is the container associated with the master product marker, then the master product marker performs that comparison. If not, the master product marker queries the slave product markers to determine which product marker is associated with the container that is to be unloaded, and queries that product marker for the fuel type indicated by the associated fuel type selector. Once known, the master product marker can then determine whether the fuel type of the product marker matches the fuel type of the tank marker. If the types do not match, then one or more actions can be taken, such as to initiate an alarm in operation 1608 or to inhibit the unload with operation 1610. In some embodiments operation 1608 involves sending a message from a slave product marker to the master product marker requesting that the master product marker initiate an alarm. In some embodiments the message also identifies the mismatch that has been detected and how the event should be logged by the master product marker.

If the fuel types do match, then the unload is permitted to continue in operation 1612, and the data is logged in operation 1614.

Operation 1616 is then performed to determine when the unload is completed. Upon completion, operation 1618 is performed to check whether the product marker has been properly set to empty. If the container that was unloaded is associated with a slave product marker, a message is sent to the product marker. The response indicates the status of the fuel type selector. If the status is not empty, then operation 1620 is performed to alert the operator. The alert continues until a timeout is reached (operation 1622), the alert is reset (operation 1624), or the operator sets the product marker to empty (operation 1618).

Although portions of the above description is described in the context of a particular embodiment involving the transportation of fuel, other embodiments are used for the transportation of other liquids, such as water or chemicals other than fuel.

Figure 17:
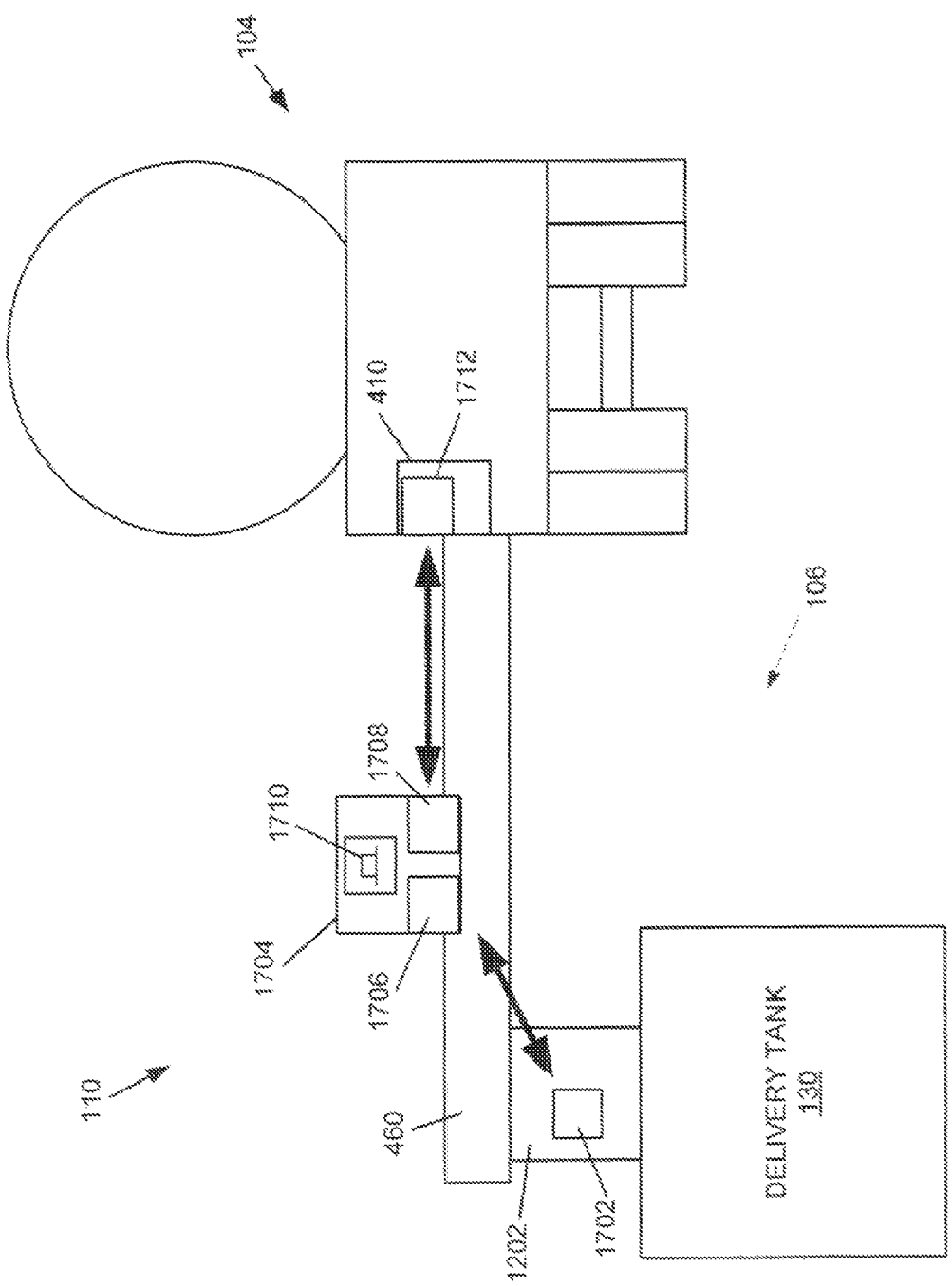
FIG. 17 is a schematic block diagram of an example product marker system utilizing wireless communication.

FIG. 17 is a schematic block diagram of an example product marker system 110 utilizing wireless communication. Product marker system 110 is illustrated at a drop off location 106 including a delivery tank 130. Delivery tank 130 includes plumbing that leads from the hose port 1202 into the fuel container portion of delivery tank 130. A tanker truck 104 stores fuel to be unloaded into delivery tank 130. Tanker truck 104 includes a hose 460 that is connected by the operator to the hose port 1202.

In this example, product marker system 110 includes tank marker 1702, relay device 1704, and product marker 410. Relay device 1704 includes reader 1706, wireless communication device 1708, and input device 1710. Product marker 410 includes wireless communication device 1712.

In this example, tank marker 1702 includes a device configured to patent communicate data using electromagnetic waves, such as a radio frequency identification (RFID) tag. The RFID tag typically includes at least an integrated circuit and an antenna. In some embodiments the RFID tag is an active device including a power storage device, such as a battery. In another embodiment, the RFID tag is a passive device. The RFID tag is programmed to include at least a fuel type identifier, and to transmit the fuel type identifier when interrogated by the reader 1706. The RFID tag can also be programmed with additional data, such as a store name, location, delivery tank identifier, or any other desired data. In one example embodiment, the fuel type identifier is a binary code. In some embodiments the binary code encodes alphanumeric data, such as according to the ASCII or other binary coding standard. A programmer can be used to program the RFID tag with the desired data. The RFID tag can be reprogrammed to change the data when desired, such as to change the fuel type identifier stored therein. One example of a suitable RFID tag is a passive RFID tag that operates according to the ISO 18000-6c standard in the UHF radio frequency band (e.g., 860 MHz to 960 MHz) utilizing RF backscatter for modulation. Other embodiments include other RFID tags or other communication devices.

Other types of wireless communication are used in other embodiments, such as optical, infrared, or other known methods of wirelessly communicating digital data.

Relay device 1704 includes a reader 1706 configured to receive data from tank marker 1702. In one example, reader 1706 is an RFID tag reader. Relay 1704 is connected to tanker truck 104, and preferably to a fitting or other portion of hose 460 that is in close proximity to hose port 1202 of delivery tank 130 when hose 460 is connected to hose port 1202.

In this example, reader 1706 broadcasts an RF signal that is received by tank marker 1702. Upon receipt of the RF signal, tank marker 1702 generates a return RF signal that encodes digital data and is received by reader 1706. In some embodiments the wireless range of reader 1706 is limited so that communication will only occur successfully between reader 1706 and tank marker 1702 if they are in close proximity to each other. For example, less than about 3 feet away. Other embodiments have other ranges, such as less than about 5 feet, less than about 10 feet, less than about 20 feet. Some embodiments, however, will communicate at distances of greater than about 20 feet.

Input device 1710, such as a button or switch, is provided in some embodiments to initiate communication between relay 1704, tank marker 1702, and product marker 410.

Once data has been received from tank marker 1702 by reader 1706, relay 1704 communicates the data to product marker 410. In one embodiment the communication occurs through a wired communication path. However, in the illustrated embodiment, communication occurs wirelessly through wireless communication device 1708. Wireless communication device 1708 is, for example, a transmitter or a transceiver that operates according to a wireless communication protocol. Examples of such protocols include the 802.11 family of protocols, the Bluetooth® protocol, etc. Other types of wireless communication are used in other embodiments, such as optical, infrared, etc.

Wireless communication device 1708 generates one or more wireless signals that encode digital data from tank marker 1702, such as to identify a fuel type.

In some embodiments, product marker 410 includes wireless communication device 1712. The wireless communication device 1712 is similar to wireless communication device 1708 described above, and operates to receive the one or more wireless signals from wireless communication device 1708. One or more signals including the digital data are then passed to the control system 899 of the product marker. Control system 900 then compares the data received from tank marker 1702 with the fuel type identified by fuel type selector 411 (for example), and determines whether the fuel types match as discussed herein.

In some embodiments, each of multiple product markers (410, 412, 414, etc.) include a wireless communication device for communicating with relay 1704. In another possible embodiment, a single wireless communication device (such as in the master product marker 410) is utilized. Product markers utilizing wireless communication may not include wired communication ports, as they may be unnecessary. However, such ports can still be provided, if desired, to permit the operator to choose between wired and wireless communication, or to permit product marker 41° to communicate with both a wireless tank marker 1702 and a wired tank marker 420, depending on the configuration of the drop off location 106.

In addition to the above, some embodiments utilize wireless communication devices for communication between multiple product markers 410, 412, and 414.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for reducing unintentional mixing of different liquid types in a storage tank, the system comprising:
    a tanker truck, the tanker truck including a container having a liquid stored therein;
    an operator selectable mechanical liquid type selector switch, the selectable mechanical liquid type selector switch configured to generate a first signal when an operator selects a liquid type;
    a relay device including a first communication device and an identification tag reader that operates to:
        receive identifying information via the identification tag reader from a second signal originating from an identification tag located proximate to the storage tank; and
        transmit the identifying information via the first communication device;
    a control system including at least one processing device that operates to:
        receive the first signal including the operator selected liquid type;
        receive the identifying information from the relay device via a second communication device; and
        determine whether a type of liquid stored in the container is the same as a type of a liquid to be stored in the storage tank, based on comparison of the operator selected liquid type and the identifying information, prior to a transfer of the liquid from the container of the tanker truck into the storage tank.

2. The system of claim 1, further comprising a liquid flow control system operable to control the transfer of the liquid from the container into the storage tank, wherein the liquid flow control system inhibits the transfer of the liquid if the control system determines that the type of the liquid stored in the container is not the same as the type of the liquid to be stored in the storage tank.

3. The system of claim 1, wherein the operator selectable mechanical liquid type selector switch is located on the tanker truck.

4. The system of claim 1, wherein the operator actuates the selectable mechanical liquid type selector switch that indicates the type of the liquid stored in the container.

5. The system of claim 1, further comprising an alarm, wherein the alarm is activated if the control system determines that the type of the liquid stored in the container is not the same as the type of the liquid to be stored in the storage tank.

6. The system of claim 1, wherein the identification tag associated with the storage tank includes a resistor, the resistor having a resistance selected to be within a range of resistances to provide the identifying information indicating the type of liquid to be stored in the storage tank when a current is passed therethrough.

7. The system of claim 1, wherein the identification tag associated with the storage tank includes a programmed liquid type identifier, the liquid type identifier being identifying information that indicates the type of liquid to be stored in the storage tank.

8. The system of claim 1, further comprising:
    a third identification device, the third identification device coupled to the tanker truck, the tanker truck including a second container having a second liquid stored therein, the third identification device configured to generate a third signal; and
    the control system programmed to receive the third signal, to receive a fourth signal from a fourth identification device associated with a second storage tank, and to determine whether a type of the second liquid stored in the second container is the same as a type of the liquid to be stored in the second storage tank, prior to a transfer of the second liquid from the second container of the tanker truck into the second storage tank.

9. A method for reducing unintentional mixing of different liquid types in a storage tank, the method comprising:
- receiving a first signal including a liquid type selected by an operator via an operator selectable mechanical liquid type selector switch coupled to a tanker truck, wherein the first signal is associated with a type of liquid in a container of the tanker truck;
- receiving a second signal via a second communication device from a relay device having a first communication device, the second signal originating from an identification tag associated with the storage tank, wherein the second signal is associated with a type of liquid to be stored in the storage tank;
- determining, using a control system containing at least one processing device, whether the type of the liquid stored in the container is the same as the type of liquid to be stored in the storage tank using the first signal and the second signal; and
- dispensing the liquid from the container of the tanker truck into the storage tank after determining that the type of the liquid stored in the container is the same as the type of liquid to be stored in the storage tank.

10. The method of claim 9, further comprising detecting an initiation of an unload operation prior to receiving the first and second signals.

11. The method of claim 9, further comprising inhibiting a transfer of the liquid from the tanker truck to the storage tank and generating an alarm if the type of the liquid stored in the container is not the same as the type of the liquid to be stored in the storage tank.

12. The method of claim 9, further comprising permitting a transfer of the liquid from the tanker truck to the storage tank if the type of the liquid stored in the container is the same as the type of the liquid to be stored in the storage tank.

13. The method of claim 12, further comprising:
- receiving a third signal from the operator selectable mechanical liquid type selector switch after the transfer of the liquid; and
- generating an alarm if the third signal does not indicate that the container is empty.

14. The method of claim 9, further comprising:
- receiving a bypass input from an operator; and
- permitting a transfer of the liquid from the tanker truck to the storage tank even if the type of the liquid stored in the container is not the same as the type of the liquid to be stored in the storage tank.

15. The method of claim 9, further comprising:
- storing data in memory to record one or more dates or times of events including the result of the determination; and
- communicating at least some of the data to a computing device onboard the tanker truck.

16. The method of claim 9, including reprogramming the identification tag associated with the storage tank when the storage tank is used with a different liquid.

17. A method for reducing unintentional mixing of different liquid types in a storage tank, the method comprising:
- receiving a first signal including a liquid type from an operator selectable mechanical liquid type selector switch, wherein the first signal is associated with a type of liquid in a container of the tanker truck;
- receiving a second signal via a second communication device from a relay device having a first communication device, the second signal originating from an identification tag associated with the storage tank, wherein the second signal is associated with a type of liquid to be stored in the storage tank;
- determining, using a control system containing at least one processing device, whether the type of the liquid stored in the container is the same as the type of liquid to be stored in the storage tank using the first signal and the second signal;
- dispensing the liquid from the container of the tanker truck into the storage tank after determining that the type of the liquid stored in the container is the same as the type of liquid to be stored in the storage tank;
- emptying the storage tank; and
- reprogramming the identification tag associated with the storage tank to indicate the storage tank has a different liquid therein such that the storage tank is ready for use with the different liquid.

18. The method of claim 17, wherein receiving a second signal is provided via a second wireless communication device from a relay device having a first wireless communication device.

19. The method of claim 17, wherein receiving the first signal includes receiving the liquid type from the operator selectable mechanical liquid type selector switch wherein the operator selects the liquid type.

20. The method of claim 17, wherein the operator selectable mechanical liquid type selector switch is located on the tanker truck.

* * * * *